(12) United States Patent
Lee

(10) Patent No.: US 7,106,393 B2
(45) Date of Patent: *Sep. 12, 2006

(54) BACKLIGHT HAVING OPTICAL SHEET COUPLED TO SHEET FIXING PROTRUSION AND LIQUID CRYSTAL DISPLAY HAVING THE SAME

(75) Inventor: Young-Jae Lee, Yongin-si (KR)

(73) Assignee: Samsung Electronics Co., Ltd., (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/217,208

(22) Filed: Sep. 1, 2005

(65) Prior Publication Data

US 2006/0007708 A1  Jan. 12, 2006

Related U.S. Application Data

(63) Continuation of application No. 10/377,508, filed on Feb. 28, 2003, now Pat. No. 6,950,154.

(30) Foreign Application Priority Data

May 28, 2002 (KR) ................................ 2002-29663

(51) Int. Cl.
G02F 1/1333 (2006.01)
F21V 7/04 (2006.01)
(52) U.S. Cl. ...................... 349/58; 362/632; 362/634; 349/65

(58) Field of Classification Search ............ 349/58–60, 349/65; 362/632–634
See application file for complete search history.

(56) References Cited

U.S. PATENT DOCUMENTS

| | | | | |
|---|---|---|---|---|
| 6,068,381 A * | 5/2000 | Ayres | ........................ | 362/633 |
| 6,402,335 B1 * | 6/2002 | Kalantar et al. | ............ | 362/619 |
| 6,835,961 B1 * | 12/2004 | Fukayama | .................... | 257/84 |
| 6,847,417 B1 * | 1/2005 | Kim | ............................ | 349/58 |
| 6,950,154 B1 * | 9/2005 | Lee | ............................. | 349/58 |

* cited by examiner

Primary Examiner—Andrew Schechter
(74) Attorney, Agent, or Firm—Cantor Colburn LLP

(57) ABSTRACT

A backlight assembly and an LCD apparatus are provided. The LCD apparatus has a light guide plate for guiding a light input through side surfaces and emitting the light through an emitting surface. The light guide plate has at least one fixing recess disposed on at least one side surface of the side surfaces. The light guide plate is received in a receiving container having at least one fixing protrusion corresponding to the fixing recess. Also, the receiving container has at least one engaging hole corresponding to the fixing protrusion and disposed on a sidewall thereof. The fixing protrusion fixes the light guide plate to the receiving container and provides a space on which the engaging hole is formed. Accordingly, it is able to reduce an entire size of the LCD apparatus and the LCD apparatus can be easily assembled.

18 Claims, 32 Drawing Sheets

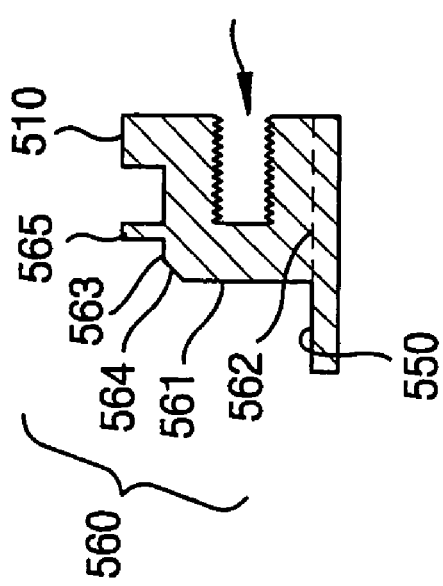
FIG.4
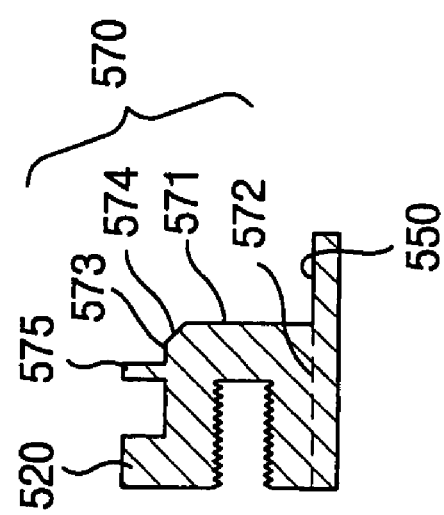

BACKLIGHT HAVING OPTICAL SHEET COUPLED TO SHEET FIXING PROTRUSION AND LIQUID CRYSTAL DISPLAY HAVING THE SAME

CROSS REFERENCE TO RELATED APPLICATIONS

This application is a continuation application of U.S. patent application Ser. No. 10/377,508, filed Feb. 28, 2003, which claims priority to Korean Patent Application 2002-0029663, filed on May 28, 2002, the entire contents of which are incorporated herein by reference.

BACKGROUND OF INVENTION

1. Field of Invention

The present invention relates to a backlight assembly and an LCD (Liquid Crystal Display) apparatus, and more particularly to a backlight assembly having a reduced overall size and an LCD apparatus having the same.

2. Description of Related Art

Recently, information-processing devices have rapidly developed to include variety of shapes, a multitude of functions and capability for high speed processing of information. Such an information-processing device requires an LCD apparatus as an interface device in order to visually confirm information processed in the information-processing device.

The LCD apparatus converts variations in optical properties into variations in visual properties, thereby displaying an image. Such optical properties include birefringence, optical linearity, dichroism and light scattering features of liquid crystal cells, which emit light due to a specific arrangement thereof.

The LCD apparatus has been gradually developed to accommodate an LCD module and a case for receiving the LCD module. However, research concerning the layout of components constituting the LCD apparatus continues in order to continuously maintain advantages of the LCD apparatus, such as small in size, light weight and so on.

In a combination structure of the LCD apparatus, a size of a combination space between the LCD module and the case is an important factor that affects an overall size of the LCD apparatus.

BRIEF SUMMARY OF THE INVENTION

The present invention provides a backlight assembly having a reduced overall size and a reduced combination process.

The present invention also provides an LCD apparatus having the backlight assembly.

In one embodiment of the invention, a backlight assembly comprises a lamp unit for generating a light; a light guide unit for guiding the light, the light guide unit comprising side surfaces for receiving the light, a reflecting surface for reflecting the light input through the side surfaces, an emitting surface for emitting the light input through the side surfaces and the light reflected from the reflecting surface, and at least one fixing recess being disposed on at least one side surface of the side surfaces; and a receiving container comprising a bottom surface, sidewalls extended from the bottom surface to provide a receiving space for receiving the lamp unit and the light guide unit and at least one fixing protrusion protruded from one of the sidewalls toward the receiving space and fixed to the fixing recess of the light guide unit.

In another embodiment of the invention, an LCD apparatus comprises a lamp unit for generating a light; a light guide unit comprising side surfaces for receiving the light, a reflecting surface for reflecting the light input through the side surfaces, an emitting surface for emitting the light input through the side surfaces and the light reflected from the reflecting surface, and at least one fixing recess being disposed on at least one side surface of the side surfaces; a first receiving container for fixing the lamp unit and the light guide unit to an external case, the first receiving container comprising a bottom surface, first sidewalls extended from the bottom surface to provide a first receiving space for receiving the lamp unit and the light guide unit, at least one fixing protrusion protruded from one of the first sidewalls toward the first receiving space and fixed to the fixing recess and at least one first engaging hole disposed on an area of the first sidewalls corresponding to the fixing protrusion; an LCD panel, received in the first receiving container, for receiving the light from the light guide unit and displaying an image in response to the received light; and a second receiving container for fixing the LCD panel to the first receiving container, the second receiving container comprising an upper surface for pressing the LCD panel, second sidewalls extended from the upper surface and coupled to the first receiving container and a first engaging recess corresponding to the first engaging hole.

According to the LCD apparatus, the light guide plate has at least one fixing recess disposed on at least one side surface of the light guide plate. The receiving container such as the bottom mold frame, bottom chassis and so on has at least one fixing protrusion corresponding to the fixing recess. Also, the receiving container has at least one engaging hole corresponding to the fixing protrusion and disposed on the sidewall thereof. The fixing protrusion fixes the light guide plate to the receiving container and provides a space on which the engaging hole is formed. Accordingly, it is able to reduce an overall size of the LCD apparatus and easily assemble the LCD apparatus.

BRIEF DESCRIPTION OF THE DRAWINGS

The above and other advantages of the present invention will become readily apparent by reference to the following detailed description when considered in conjunction with the accompanying drawings wherein:

FIGS. 2 to 4 are views showing a structure of the bottom mold frame shown in FIG. 1;

DETAILED DESCRIPTION OF THE INVENTION

Figure 1:
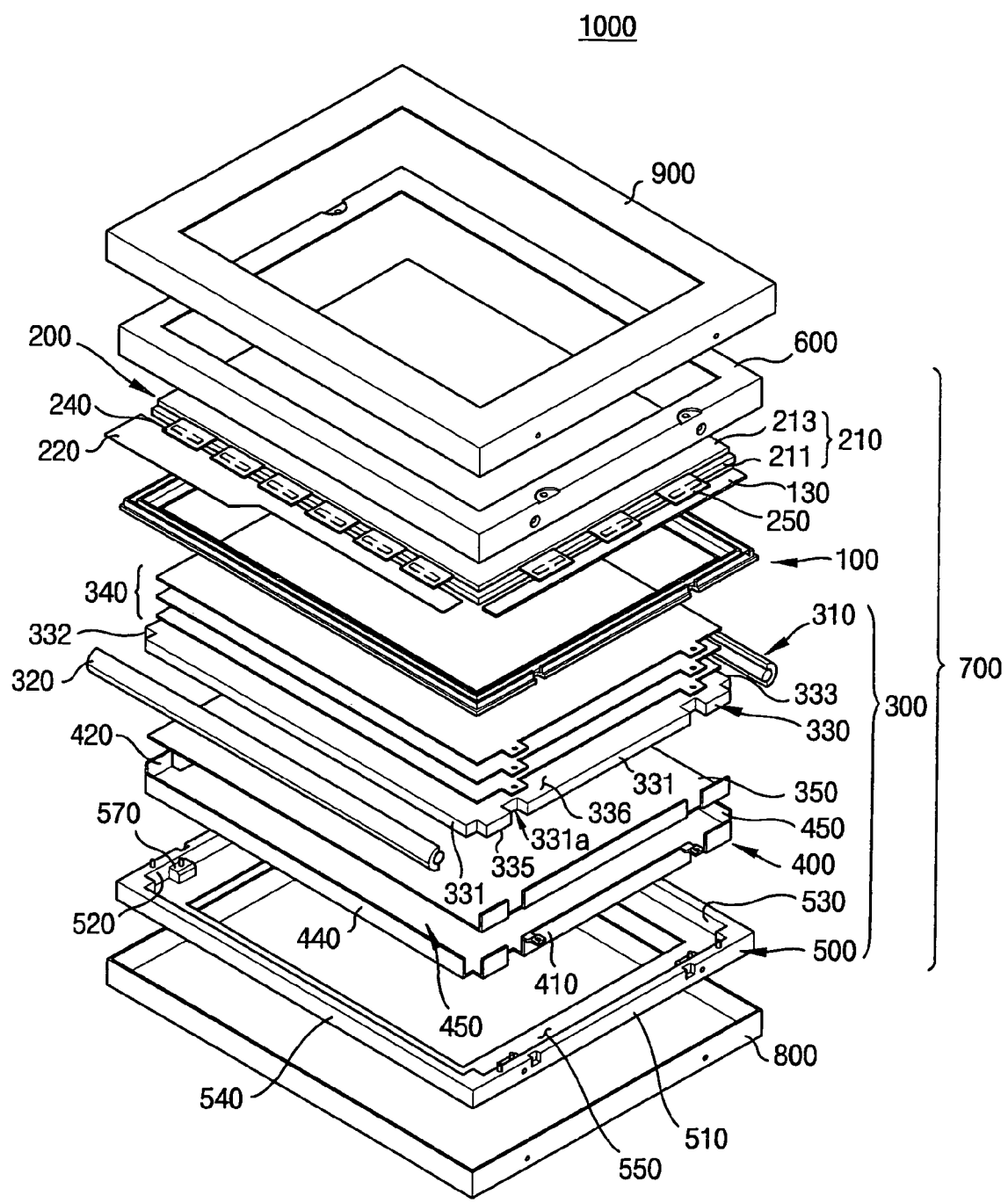
FIG. 1 is an exploded perspective view showing an LCD apparatus according to the present invention.

FIG. 1 is an exploded perspective view showing an LCD apparatus according to the present invention.

Referring to FIG. 1, an LCD apparatus 1000 includes an LCD module 700 for displaying an image in response to an image signal, a rear case 800 for receiving the LCD module 700 and a front case 900 combined with the rear case 800 to fix the LCD module 700 to the rear case 800.

The LCD module 700 may be classified into a display part for displaying the image, a receiving container for receiving the display part and a driving control part for controlling the display part.

The display part includes a display unit 200 having an LCD panel 210 for displaying the image and a backlight assembly 300 for supplying light to the display unit 200. The receiving container includes a bottom chassis 400 for receiving the display unit 200 and the backlight assembly 300, and a bottom mold frame 500 for receiving the bottom chassis 400. The bottom mold frame 500 has a bottom surface partly opened to expose a rear surface of the bottom chassis 400.

The display unit 200 includes the LCD panel 210, a data PCB (Printed Circuit Board) 220, a gate PCB 230, a data TCP (Tape Carrier Package) 240 and a gate TCP 250.

The LCD panel 210 includes a TFT (Thin Film Transistor) substrate 211, a color filter substrate 213 and a liquid crystal (not shown). The TFT substrate 211 is a transparent glass substrate on which TFTs are disposed in a matrix configuration. Each of the TFTs includes a source terminal connected to a data line, a gate terminal connected to a gate line and a drain terminal having a pixel electrode made of a transparent conductive material, for example, ITO (Indium Tin Oxide).

When an electric signal is applied to the data and gate lines of the TFTs, the source and gate terminals of each of the TFTs receive the electric signal through the data and gate lines. By receiving the electric signal, the TFTs are turned on or turned off, so that the drain terminal receives the electric signal for forming a pixel.

The color filter substrate 213 faces the TFT substrate 211. For example, RGB pixels (which are color pixels for emitting predetermined colors when the light passes therethrough) are formed on the color filter substrate 213 through a thin film process. A common electrode made of ITO is disposed on an entire surface of the color filter substrate 213.

When a power is applied to the gate terminal and the source terminal of the TFTs disposed on the TFT substrate 211, the TFTs are turned on so that an electric field is generated between the pixel electrode and the common electrode of the color filter substrate 213. The electric field varies an aligning angle of the liquid crystal injected between the TFT substrate 211 and the color filter substrate 213. Accordingly, a light transmittance of the liquid crystal is varied according to the variation of the aligning angle of the liquid crystal, so a desired image may be obtained.

As shown in FIG. 1, the data TCP 240 is connected to the data line of the LCD panel 210 so as to decide an applying timing of a data driving signal and the gate TCP 250 is connected to the gate line of the LCD panel 210 so as to decide an applying timing of a gate driving signal.

The data PCB 220 for receiving an image signal from an external and applying the data driving signal to the data line is connected to the data TCP 240 and the gate PCB 230 for applying the gate driving signal to the gate line is connected to the gate TCP 250. The data and gate PCBs 220 and 230 receive the image signal from an external information-processing device (not shown), such as a computer and generate the signals for driving the LCD panel 210, such as the gate driving signal, the data driving signal and a plurality of timing signals for timely applying the gate and data driving signals.

The backlight assembly 300 is disposed under the display unit 200 so as to uniformly supply light to the display unit 200. The backlight assembly 300 includes first and second lamp units 310 and 320, a light guide plate 330, an optical sheet 340 and a reflecting plate 350. The first and second lamp units 310 and 320 include a CCFL (Cold Cathode Fluorescent Lamp) for generating the light, respectively.

The light guide plate 330 has a size corresponding to that of the LCD panel 210 of the display unit 200 and is disposed under the LCD panel 210 to change an optical path while guiding the light emitted from the first and second lamp units 310 and 320 toward the display unit 200.

The light guide plate 330 includes first, second, third and fourth side surfaces 331, 332, 333 and 334, a reflecting surface 335 and an emitting surface 336 facing the reflecting surface 335. The reflecting and emitting surfaces 335 and 336 connect the first to fourth side surfaces 331, 332, 333 and 334 to each other. The third and fourth side surfaces 333 and 334 receive the light from the first and second lamp units 310 and 320. The light input to the light guide plate 330 through the third and fourth side surfaces 333 and 334 are directly emitted toward the LCD panel 210 through the emitting surface 336 or emitted toward the LCD panel 210 after reflecting from the reflecting surface 335. The first and second side surfaces 331 and 332 include at least one first fixing recess 331a and at least one second fixing recess (not shown), respectively.

A plurality of optical sheets 340 is disposed on the emitting surface 336 of the light guide plate 330 in order to provide uniform brightness of the light emitted from the light guide plate 330 to the LCD panel 210. The reflecting plate 350 is disposed under the light guide plate 210 facing the reflecting surface 335 to reflect the light leaked through the reflecting surface 335 toward the light guide plate 330.

The bottom mold frame 500 includes a bottom surface 550 and first to fourth sidewalls 510, 520, 530 and 540 extended from the bottom surface 550 to provide a receiving space for receiving the bottom chassis 400. The bottom mold frame 500 further includes a first fixing protrusion 560 protruded from the first sidewall 510 toward the receiving space and a second fixing protrusion 570 protruded from the second sidewall 520 toward the receiving space.

The bottom chassis 400 includes a receiving surface 450 and first to fourth side surfaces 410, 420, 430 and 440 extended from the receiving surface 450 so as to sequentially receive the first and second lamp units 310 and 320, the reflecting plate 350, the light guide plate 330 and the optical sheets 340. The light guide plate 330 and the optical sheets 340 are received in the bottom chassis 400 and fixed to the bottom mold frame 500.

The LCD module 700 further includes a top mold frame 100 disposed on the bottom chassis 400 and the bottom mold frame 500. The top mold frame 100 pressurizes the optical sheets 340 and supports the display unit 200 provided on the optical sheets 340. The display unit 200 is provided on the top mold frame 100, and the top chassis 600 is provided on the display unit 200 to prevent the display unit 200 from being deviated from the bottom chassis 400.

Figure 2:
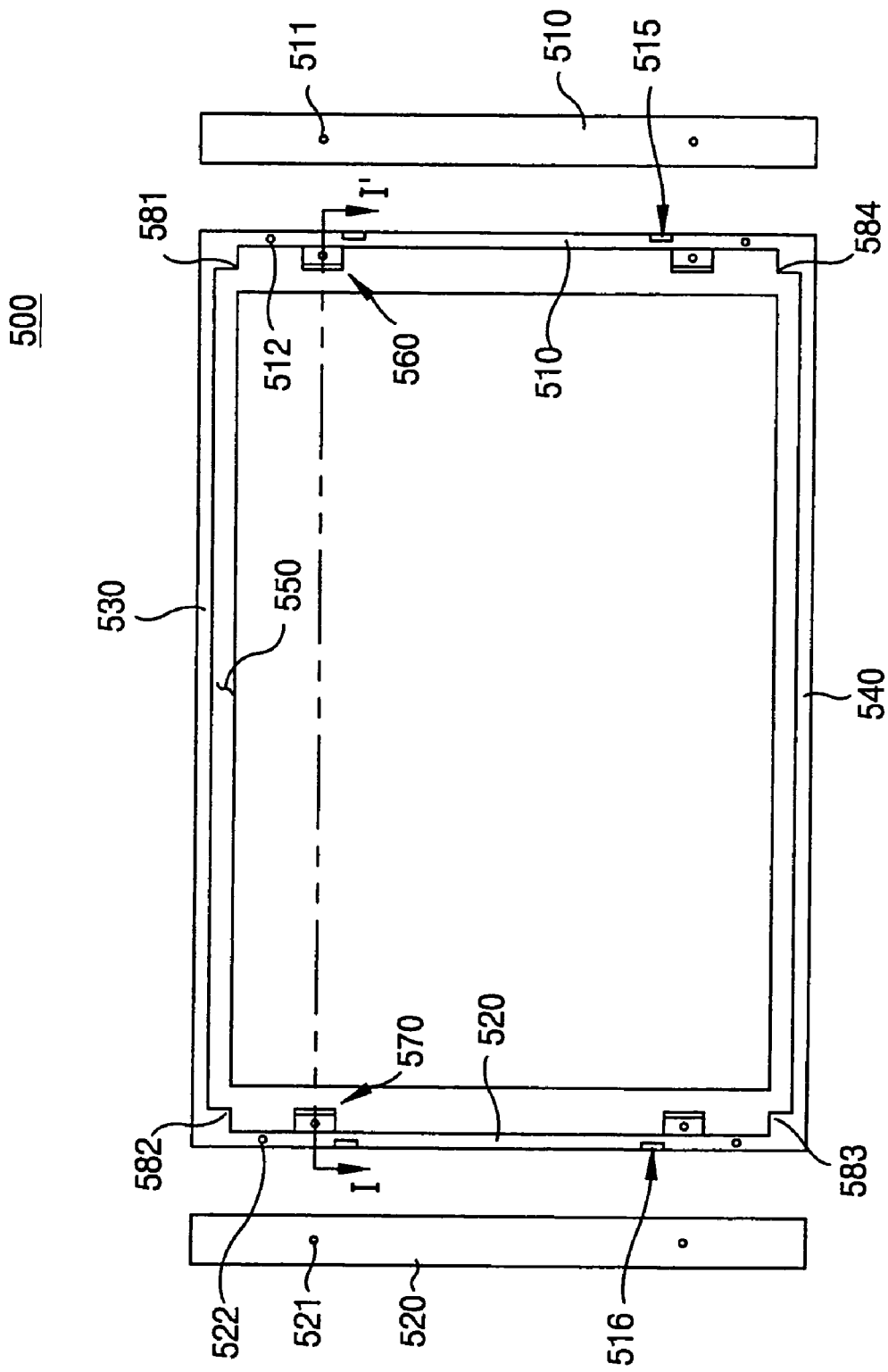
Figure 3:
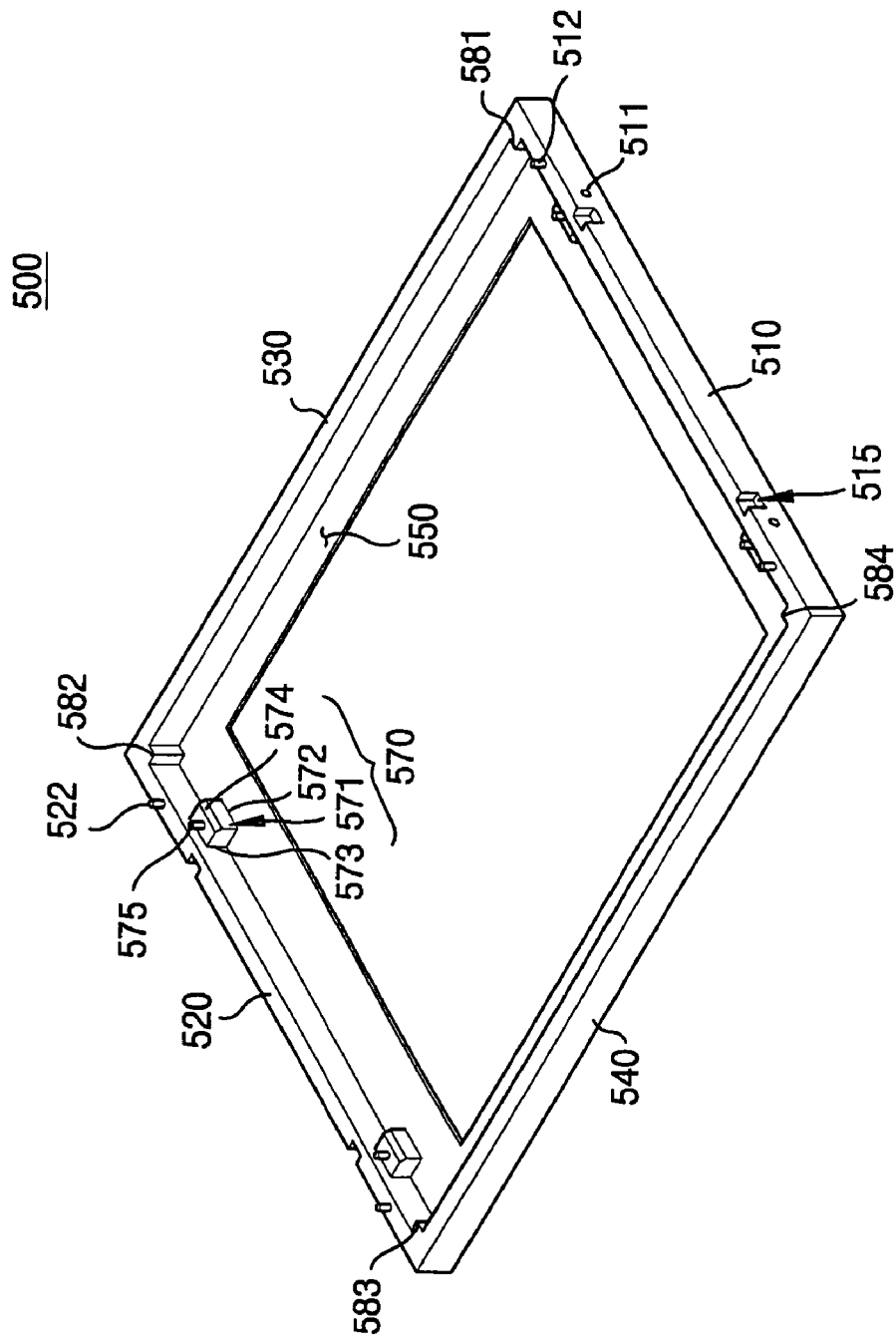

FIGS. 2 to 4 are views showing a structure of the bottom mold frame shown in FIG. 1.

Referring to FIGS. 2 to 4, the bottom mold frame 500 includes the bottom surface 550 and the first to fourth sidewalls 510, 520, 530 and 540 extended from the bottom surface 550 to provide the receiving space for receiving the bottom chassis 400. The bottom mold frame 500 further includes the first and second fixing protrusions 560 and 570 protruded from the first and second sidewalls 510 and 520 toward the receiving surface, the first and second sidewalls 510 and 520 facing to each other. The first and second fixing protrusions 560 and 570 are combined to the light guide plate 330 to prevent the light guide plate 330 from being moved by an external impact.

The bottom mold frame 500 further includes a first engaging hole 511 disposed on the first sidewall 510 and a second engaging hole 521 disposed on the second sidewall 520. The first and second engaging holes 511 and 521 correspond to the first and second fixing protrusions 560 and 570, respectively. The first and second engaging holes 511 and 521 communicate with the first and second fixing protrusions 560 and 570 through the first and second sidewalls 510 and 520, respectively. The first and second engaging holes 511 and 521 are coupled to the front and rear cases 900 and 800 to be combined to the bottom mold frame 500. Accordingly, although the widths of the first and second sidewalls 510 and 520 are not large, it is able to obtain a combining space between the bottom bold frame 500 and the front and rear cases 900 and 800. The first and second fixing protrusions 560 and 570 fix the light guide plate 330 to the bottom mold frame 500 as well as provide the combining space of the first and second engaging holes 512 and 521 and the front and rear cases 900 and 800.

The first and second fixing protrusions 560 and 570 include guide surfaces 561 and 571 for guiding the light guide plate 330 and coming in contact with the first and second side surface 331 and 332 of the light guide plate 330, lower surfaces 562 and 572 for coming in contact with the bottom surface 550 of the bottom mold frame 500, upper surfaces 563 and 573 opposite the lower surfaces 562 and 572, and inclined surfaces 564 and 574 disposed between the guide surfaces 561 and 571 and the upper surfaces 563 and 573 so as to reflect the light leaked from the first and second side surfaces 331 and 332 to the light guide plate 330, respectively.

The bottom mold frame 500 includes first to fourth catching protrusions 581, 582, 583 and 584 disposed on four corners thereof and extended from the four corners toward the receiving space. The first to fourth catching protrusions 581, 582, 583 and 584 are combined to the light guide plate 330 when the light guide plate 330 is received in the receiving space.

The bottom mold frame 500 includes a first sheet fixing protrusion 565 and a second sheet fixing protrusion 575 protruded from the upper surfaces 563 and 573 of the first and second fixing protrusions 560 and 570 in a predetermined height, respectively. The first and second sheet fixing protrusions 565 and 575 are coupled to the optical sheets 340 to prevent the optical sheets 340 from being moved by the external impact. The bottom mold frame 500 includes a first mold fixing protrusion 512 disposed on the first sidewall 510 and a second mold fixing protrusion 522 disposed on the second sidewall 520. The first and second mold fixing protrusions 512 and 522 are coupled to the top mold frame 100.

Figure 5:
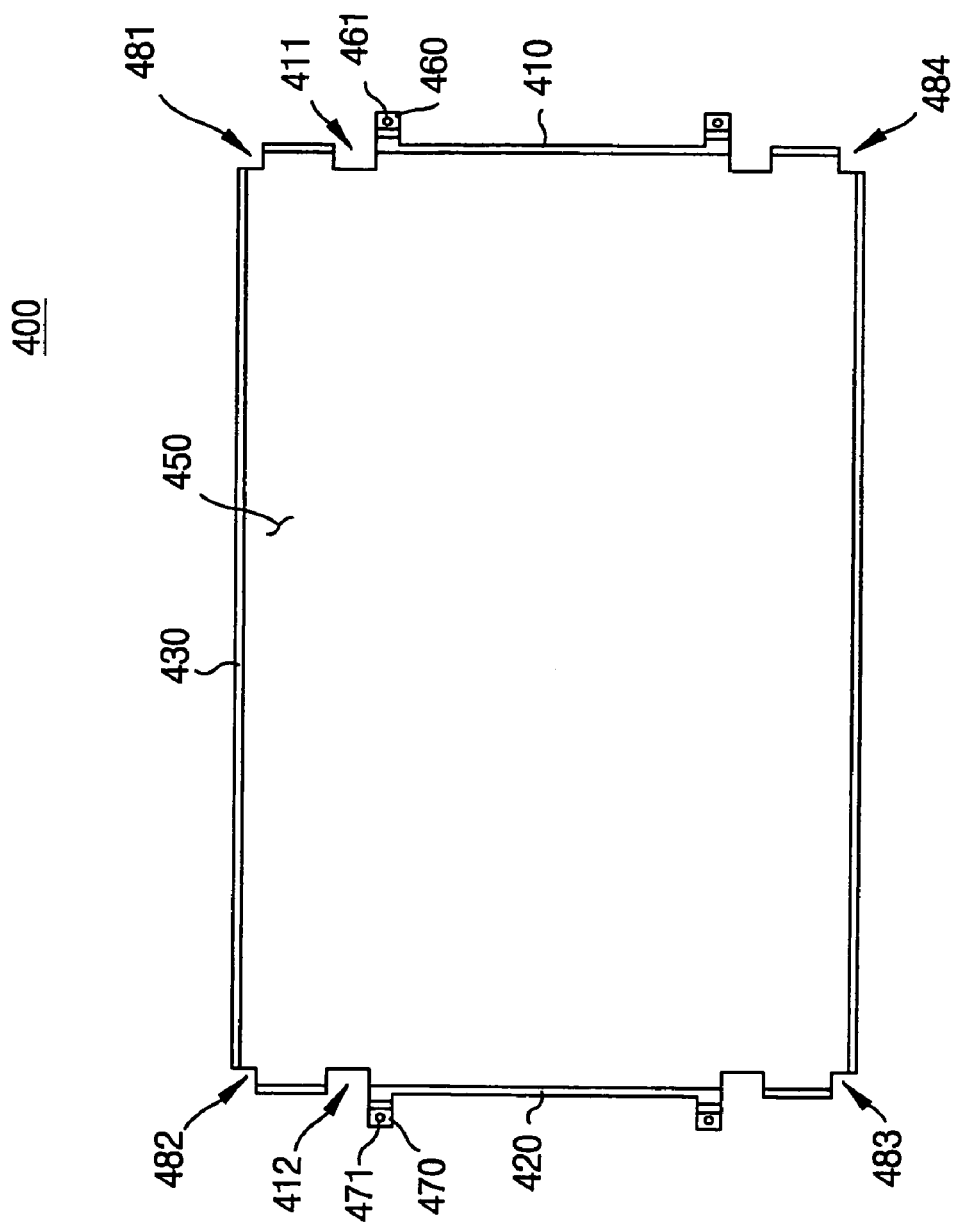
FIGS. 5 and 6 are schematic views showing a structure of the bottom chassis shown in FIG. 1.
Figure 6:
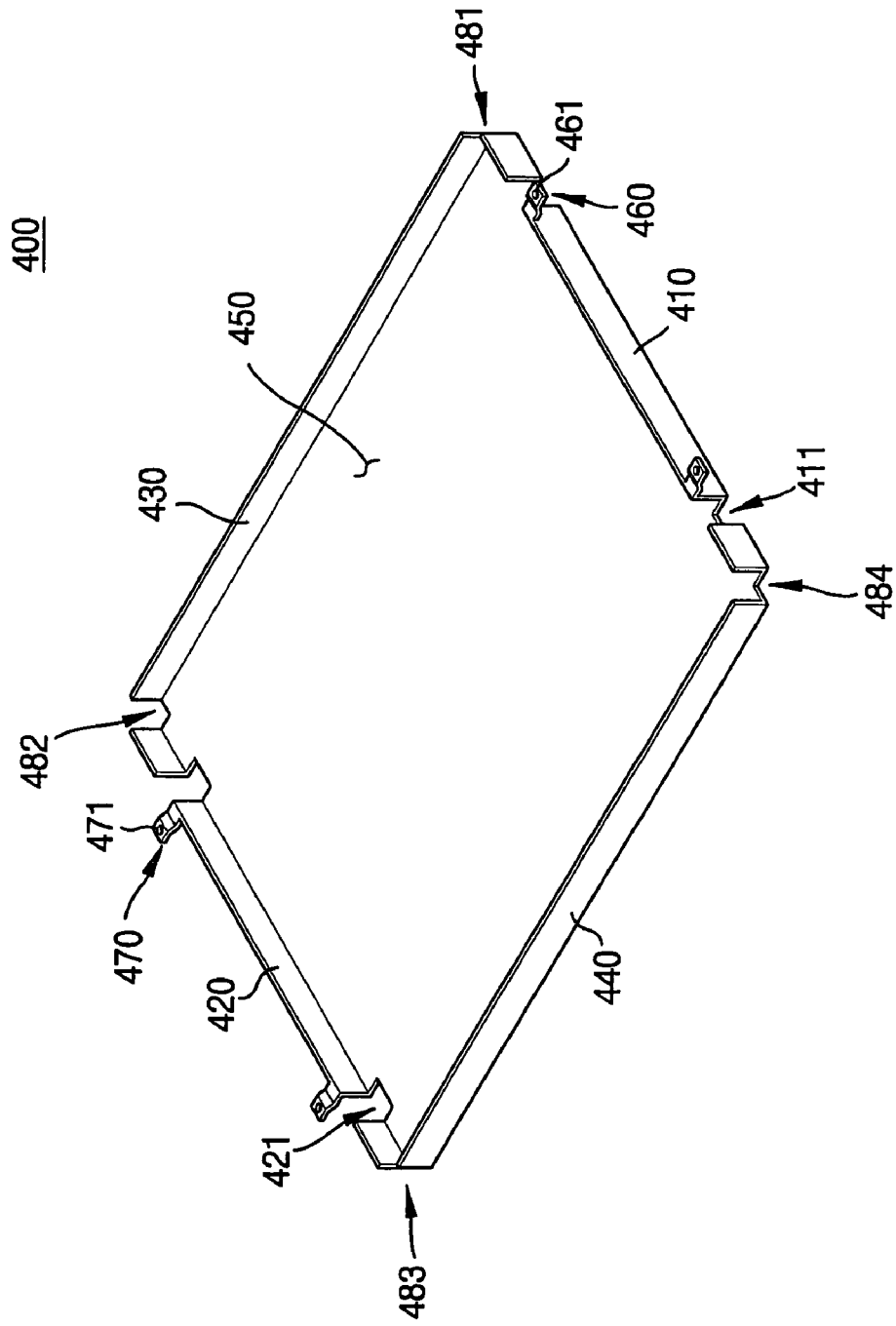
Figure 7:
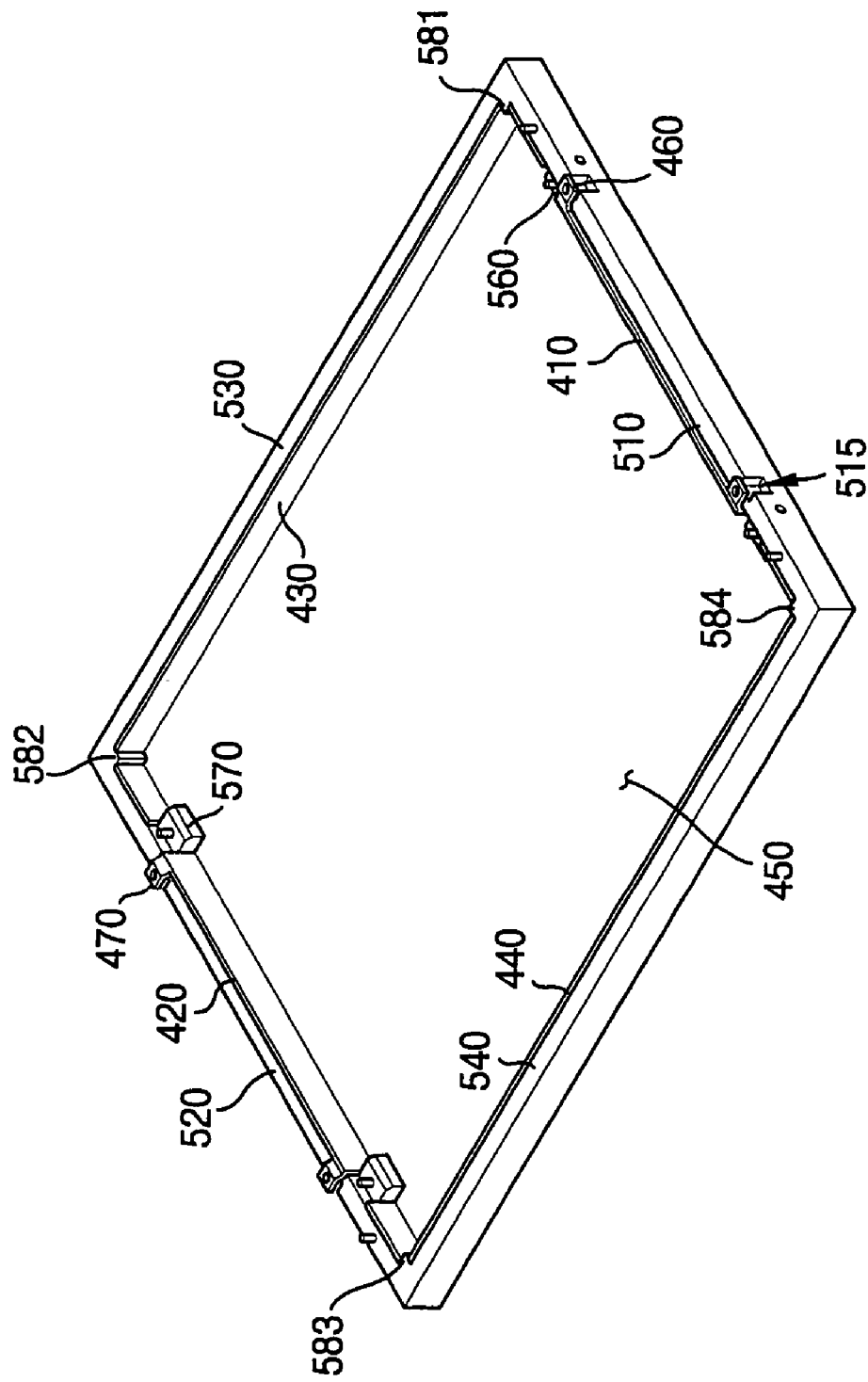
FIGS. 7 and 8 are schematic views showing an assembled structure of the bottom chassis and the bottom mold frame shown in FIG. 1.
Figure 8:
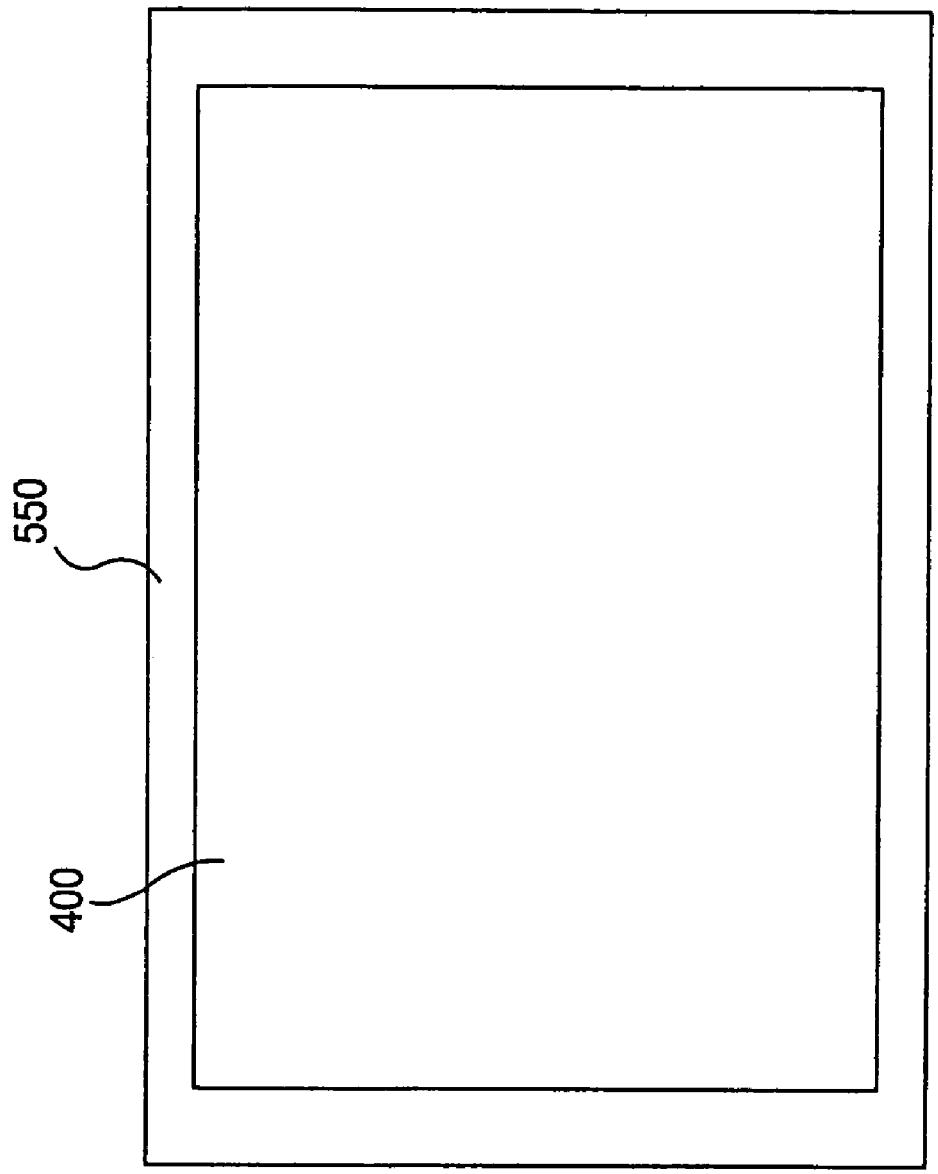

FIGS. 5 and 6 are schematic views showing a structure of the bottom chassis shown in FIG. 1. FIGS. 7 and 8 are schematic views showing an assembled structure of the bottom chassis and the bottom mold frame shown in FIG. 1.

Referring to FIGS. 5 and 6, the bottom chassis 400 includes a bottom surface 450 and first to fourth sidewalls 410, 420, 430 and 440 extended from the bottom surface 450 to provide a receiving space.

The bottom chassis 400 includes a first opening 411 disposed over the first sidewall 410 and the bottom surface 450 to insert the first fixing protrusion 560 of the bottom mold frame 500 into the receiving space of the bottom chassis 400 and a second opening 412 disposed over the second sidewall 420 and the bottom surface 450 to insert the second fixing protrusion 570 of the bottom mold frame 500 into the receiving space of the bottom chassis 400. The bottom chassis 400 includes third to sixth openings 481, 482, 483 and 484 for receiving the first to fourth catching protrusions 581, 582, 583 and 584 of the bottom mold frame 500. The third to sixth openings 481, 482, 483 and 484 are disposed on four corners of the bottom chassis 400, respectively.

The bottom chassis 400 includes a first combining portion 460 extended from the first sidewall 410 toward an external of the bottom chassis 400 and a second combining portion 470 extended from the second sidewall 420 toward the external of the bottom chassis 400. The bottom chassis 400 includes a first penetration hole 461 penetrated through the first combining portion 460 and a second penetration hole 471 penetrated through the second combining portion 470. The first and second penetration holes 461 and 471 are coupled to the top chassis 600.

Referring to FIG. 7, when the bottom chassis 400 is received into the bottom mold frame 500, the bottom surface 450 of the bottom chassis 400 faces the bottom surface 550 of the bottom mold frame 500 and the first to fourth sidewalls 510, 520, 530 and 540 of the bottom mold frame 500 faces the first to fourth sidewalls 410, 420, 430 and 440 of the bottom chassis 400. The first and second fixing protrusions 560 and 570 of the bottom mold frame 500 are inserted into the first and second openings 411 and 412, respectively. The first to fourth catching protrusions 581, 582, 583 and 584 are inserted into the third to sixth openings 481, 482, 483 and 484, respectively.

The first combining portion 460 of the bottom chassis 400 is disposed on the first sidewall 510 of the bottom mold frame 500 and the second combining portion 470 is disposed on the second sidewall 520, when the bottom chassis 400 is combined with the bottom mold frame 500. The bottom mold frame 500 includes a first receiving recess 515 disposed on the first sidewall 510 thereof and recessed toward the receiving space and a second receiving recess 525 disposed on the second sidewall 520 thereof and recessed toward the receiving space. When the first and second combining portions 460 and 470 are coupled to the top chassis 600 using screws, the first and second receiving recesses 515 and 525 receive screws (not shown) respectively so as to prevent the thickness of the LCD apparatus 1000 from being increased due to the screws.

FIG. 8 shows a bottom view of the assembled structure of the bottom mole frame 500 and the bottom chassis 400. The bottom surface 550 of the bottom mold frame 500 is partially opened, so that the rear surface of the bottom chassis 400 is exposed to the external.

Figure 9:
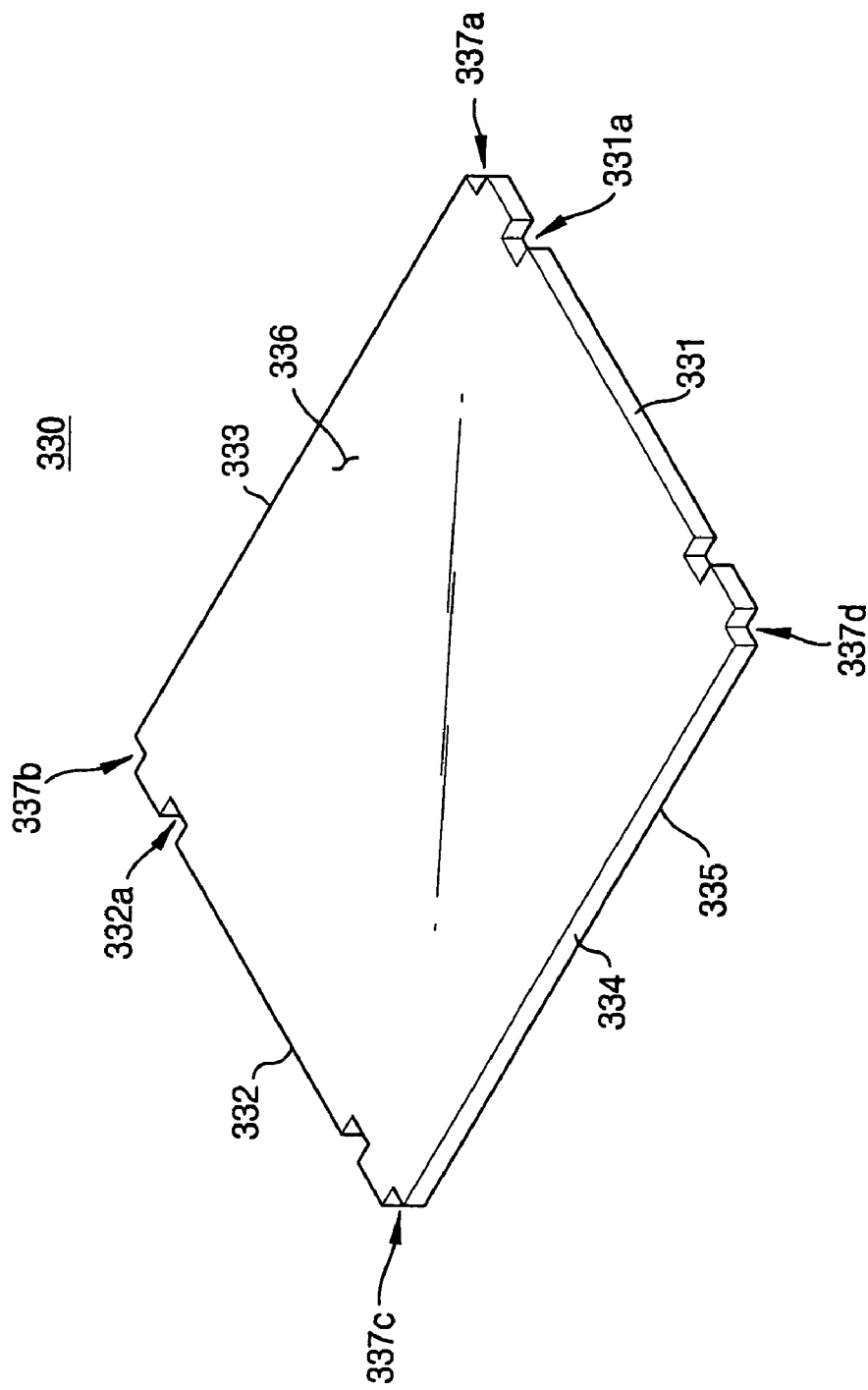
FIG. 9 is a perspective view showing a structure of the light guide plate shown in FIG. 1.
Figure 10:
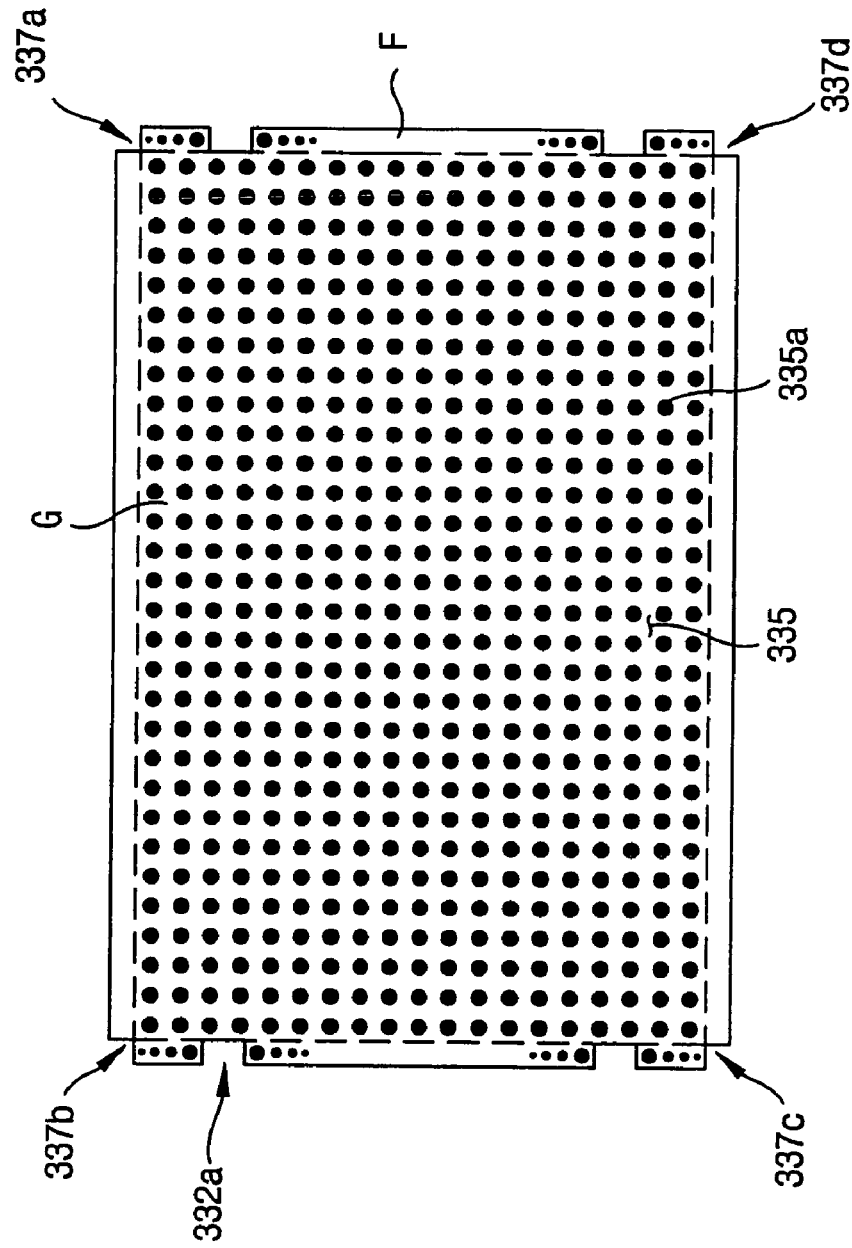
FIG. 10 is a schematic view showing a rear structure of the light guide plate shown in FIG. 9.

FIG. 9 is a perspective view showing a structure of the light guide plate shown in FIG. 1 and FIG. 10 is a schematic view showing a rear structure of the light guide plate shown in FIG. 9.

Referring to FIG. 9, the light guide plate 330 includes the first to fourth side surfaces 331, 332, 333 and 334, the reflecting surface 335 and the emitting surface 336 disposed between the first to fourth side surfaces 331, 332, 333 and 334. The light is incident on at least one of the first to fourth side surfaces 331, 332, 333 and 334. The light is incident on the third and fourth side surfaces 333 and 334, for example, when the first and second lamp units 310 and 320 are disposed on the third and fourth side surfaces 333 and 334, respectively. The emitting surface 336 emits the incident light and the reflecting surface 335 reflects the incident light to the emitting surface 336. Thus, the light guide plate 330 guides the light input through the third and fourth side surfaces 333 and 334 to the LCD panel 210.

The light guide plate 330 includes the first fixing recess 331 a disposed on the first side surface 331 and the second fixing recess 332a disposed on the second side surface 332. The first and second fixing recesses 331a and 332a are formed by partially cutting the first and second side surfaces 331 and 332 of the light guide plate 330 from the emitting surface 336 to the reflecting surface 335. The first and second fixing recesses 331a and 332a have, for example, a rectangular shape in viewed from the emitting surface 336. The first and second fixing recesses 331 a and 332a are coupled to the first and second fixing protrusions 560 and 570 of the bottom mold frame 500, respectively.

The light guide plate 330 includes first to fourth catching recesses 337a, 337b, 337c and 337d disposed at four corners thereof. The first to fourth catching recesses 337a, 337b, 337c and 337d are formed by partially cutting the four corners of the light guide plate 330 from the emitting surface 336 to the reflecting surface 335. The first to fourth catching recesses 337a, 337b, 337c and 337d are coupled to the first to fourth catching protrusions 581, 582, 583 and 584 of the bottom mold frame 500, respectively.

As shown in FIG. 10, the light guide plate 330 comprises an effective guiding area "G" for guiding the light from the first and second lamp units and a fixing area "F" for fixing the light guide plate 330 to the bottom mold frame 500. The effective guiding area "G" corresponds to an effective display area of the LCD panel 210. The light guide plate 330 includes a light diffusing pattern 335a disposed on a rear surface thereof within the effective guiding area "G". The light diffusing pattern 335a intercepts the light not to be transmitted through the reflecting surface 335 and increases the brightness of the light and the uniformity of the light brightness by diffusing and reflecting the light.

The light diffusing pattern 335a is partly disposed on the rear surface of the light guide plate 330 within the fixing area "F". Preferably, the light diffusing pattern 335a is disposed on the rear surface of the light guide plate 300 adjacent to the first and second fixing recesses 331a and 332a. The size of the light diffusing pattern 335a within the fixing area "F" gradually decreases according as the light diffusing pattern 335a goes away from the first and second fixing recesses 331 a and 332a. The light diffusing pattern 335a within the fixing area "F" increases the brightness of the light passing through the fixing area "F". Thus, the light diffusing pattern 335a prevent the brightness of the light from being lowered around the first and second fixing recesses 331a and 332a.

Figure 11:
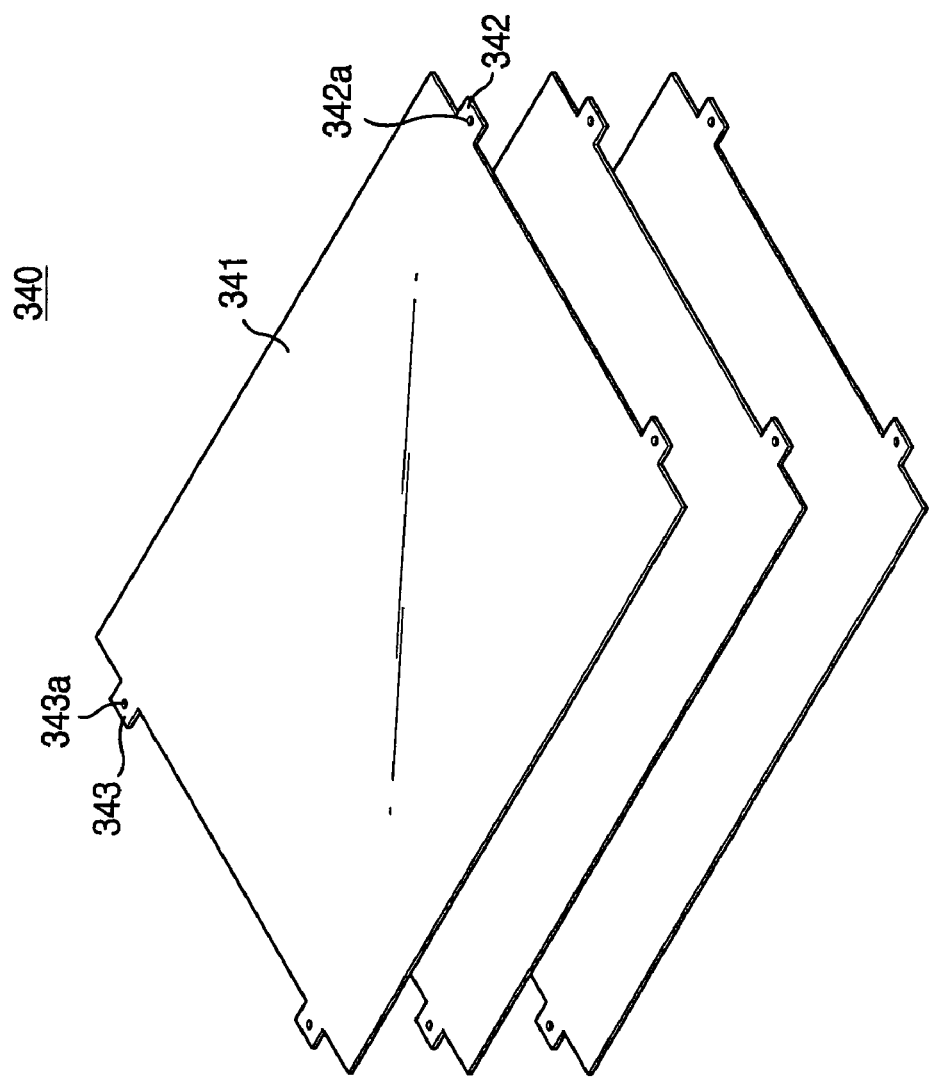
FIG. 11 is an exploded perspective view showing the optical sheets shown in FIG. 1.
Figure 12:
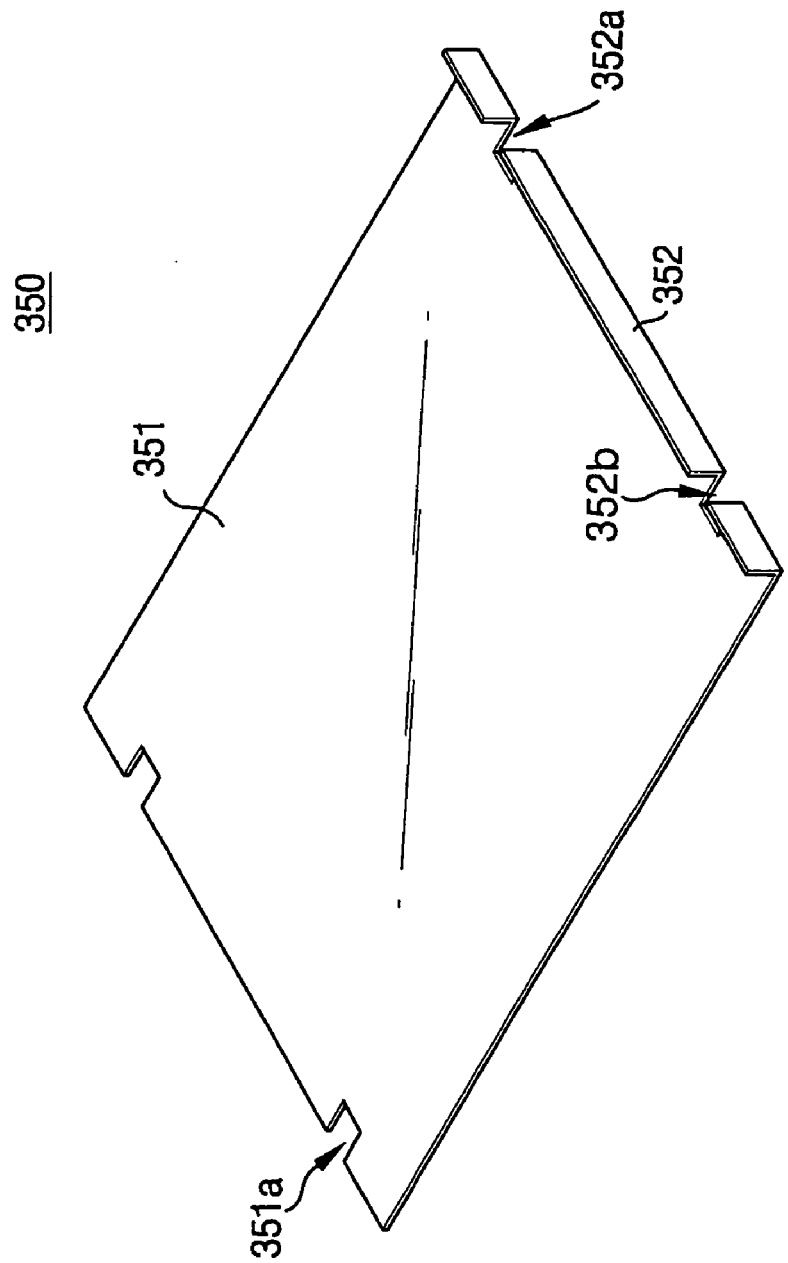
FIG. 12 is a perspective view showing the reflecting plate shown in FIG. 1.

FIG. 11 is an exploded perspective view showing the optical sheets shown in FIG. 1 and FIG. 12 is a perspective view showing the reflecting plate shown in FIG. 1.

Referring to FIG. 11, the optical sheets 340 has, for instance, three sheets. Each of three sheets includes a body portion 341 for increasing uniformity of the light brightness, a first fixing portion 342 extended from a first end portion of the body portion 341 and a second fixing portion 343 extended from a second end portion opposite to the first end portion of the body portion 341. The first fixing portion 342 is provided with a first fixing hole 342a coupled to the first mold fixing protrusion 512 of the bottom mold frame 500 and the second fixing portion 343 is provided with a second fixing hole 343a coupled to the second mold fixing protrusion 522 of the bottom mold frame 500. The first and second fixing holes 342a and 343a perforate through the first and second fixing portions 342 and 343, respectively.

Referring to FIG. 12, the reflecting plate 350 includes a first reflecting surface 351 facing the reflecting surface 335 of the light guide plate 330 and a second reflecting surface 352 facing the first side surface 331 of the light guide plate 330. The second reflecting surface 352 is extended from a first end portion of the first reflecting surface 351. The light guide plate 330 further includes a coating layer (not shown) disposed on the second side surface 332 thereof.

The second reflecting surface 352 is provided with a seventh opening 352a. The seventh opening 352a is disposed on an area of the second reflecting surface 352 corresponding to the first fixing protrusion 560 of the bottom mold frame 500. The first fixing protrusion 560 is inserted into the seventh opening 352a when the reflecting plate 350 is received in the bottom mold frame 500.

The first reflecting surface 351 reflects the light leaked from the reflecting surface 335 of the light guide plate 330 and the second reflecting surface 352 reflects the light leaked from the first side surface 331 of the light guide plate 330. The light reflected from the first and second reflecting surfaces 351 and 352 is provided to the light guide plate 330. The coating layer reflects the light leaked from the second side surface 332 of the light guide plate 330 toward the light guide plate 330. Thus, the reflecting plate 350 may increase the brightness of the light emitted from the light guide plate 330.

Figure 13:
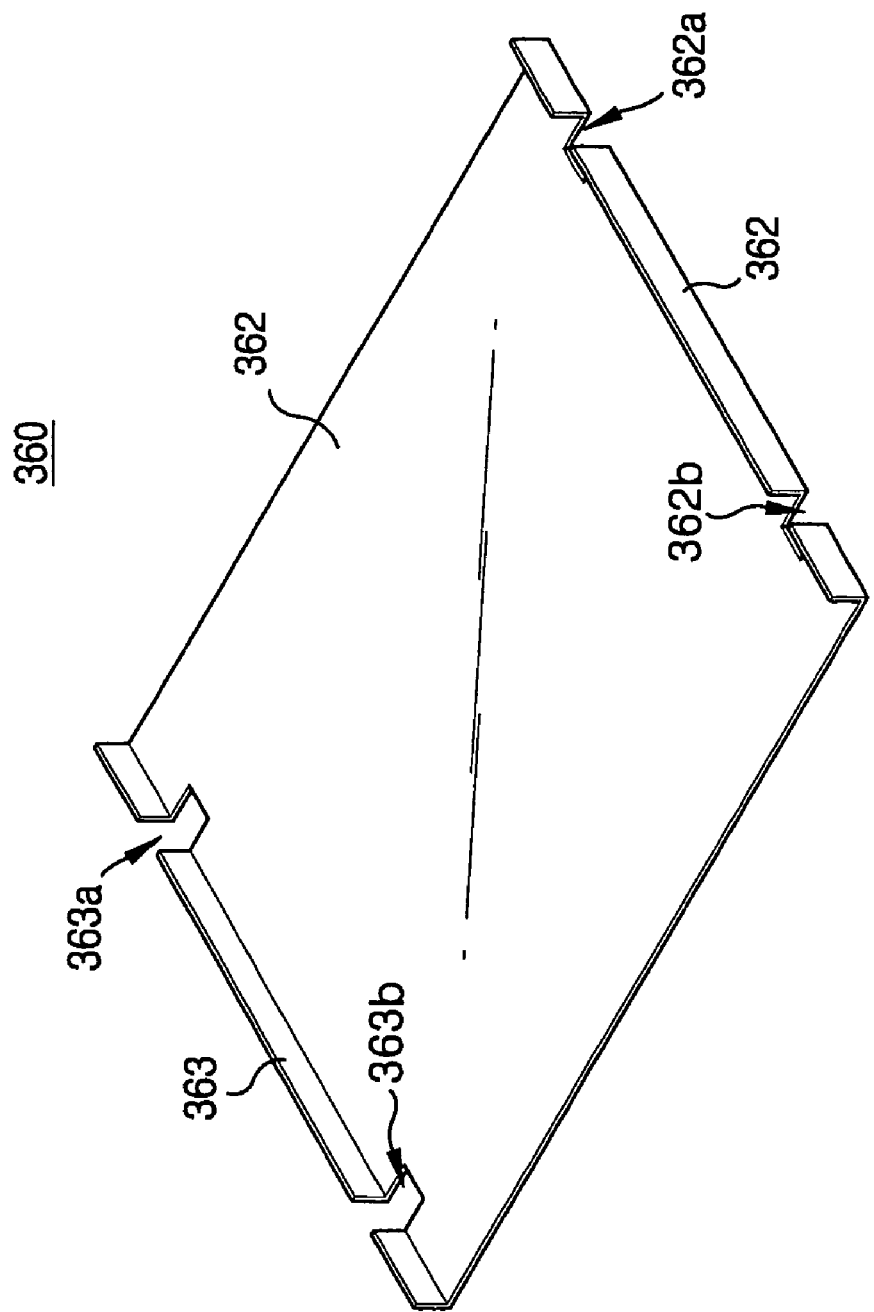
FIG. 13 is a perspective view showing a structure of a reflecting plate according to another embodiment of the present invention.

FIG. 13 is a perspective view showing a structure of a reflecting plate according to another embodiment of the present invention.

Referring to FIG. 13, the reflecting plate 360 includes a first reflecting surface 361 facing the reflecting surface 335 of the light guide plate 330, a second reflecting surface 362 facing the first side surface 331 of the light guide plate 330 and a third reflecting surface 363 facing the second side surface 332 of the light guide plate 330. The second reflecting surface 362 is extended from a first end portion of the first reflecting surface 361 and third reflecting surface 363 is extended from a second end portion opposite to the first end portion of the first reflecting surface 361. The second reflecting surface 362 is provided with an eighth opening 362a corresponding to the first fixing protrusion 560 of the bottom mold frame 500 and the third reflecting surface 363 is provided with a ninth opening 363a corresponding to the second fixing protrusion 570 of the bottom mold frame 500.

Accordingly, the first reflecting surface 361 reflects the light leaked from the reflecting surface 335 of the light guide plate 330, the second reflecting surface 362 reflects the light leaked from the first side surface 331 of the light guide plate 330 and the third reflecting surface 363 reflects the light leaked from the second side surface 332 of the light guide plate 330. The light reflected from the first to third reflecting surfaces 361, 362 and 363 is provided to the light guide plate 330. Therefore, the reflecting plate 360 may increase the brightness of the light emitted from the light guide plate 330.

Figure 14:
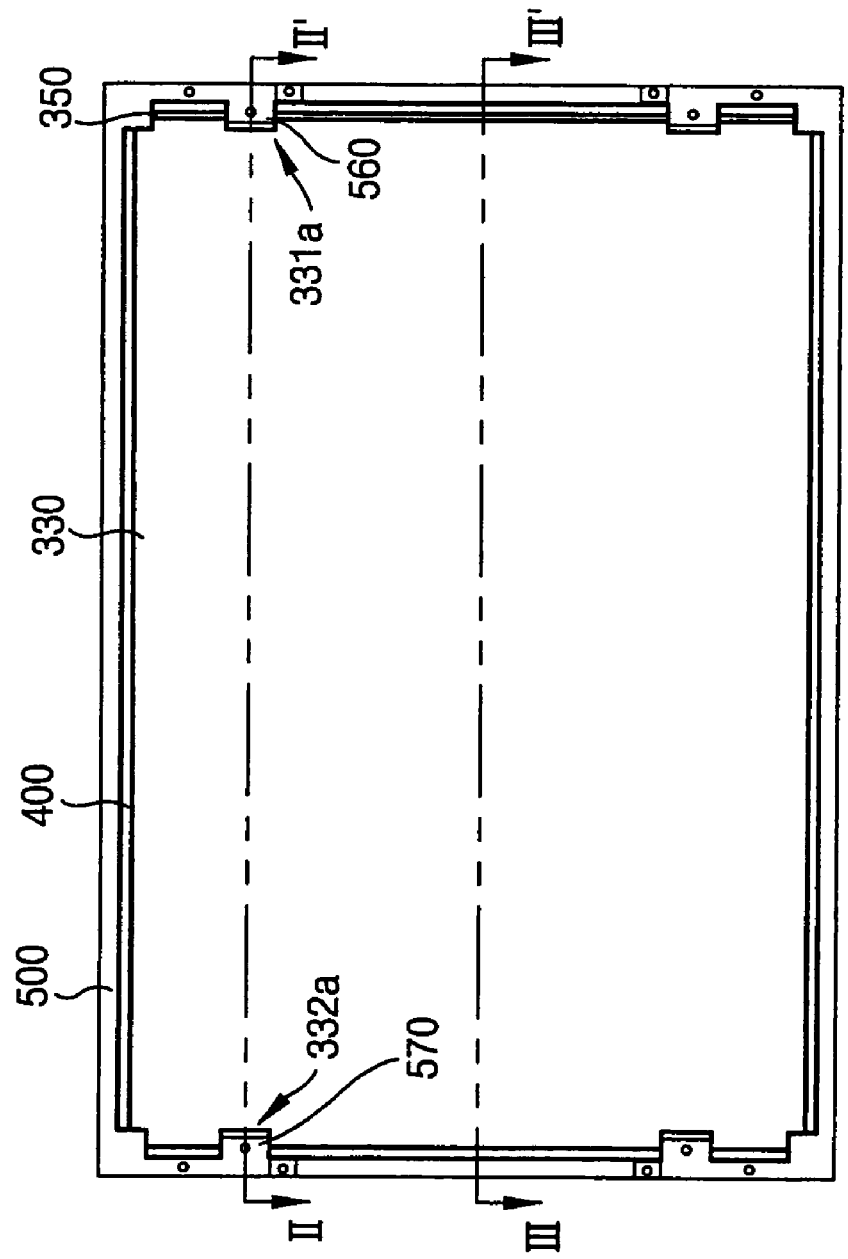
FIG. 14 is a schematic view showing an assembled structure of the bottom chassis, reflecting plate and light guide plate, according to the present invention.
Figure 15:
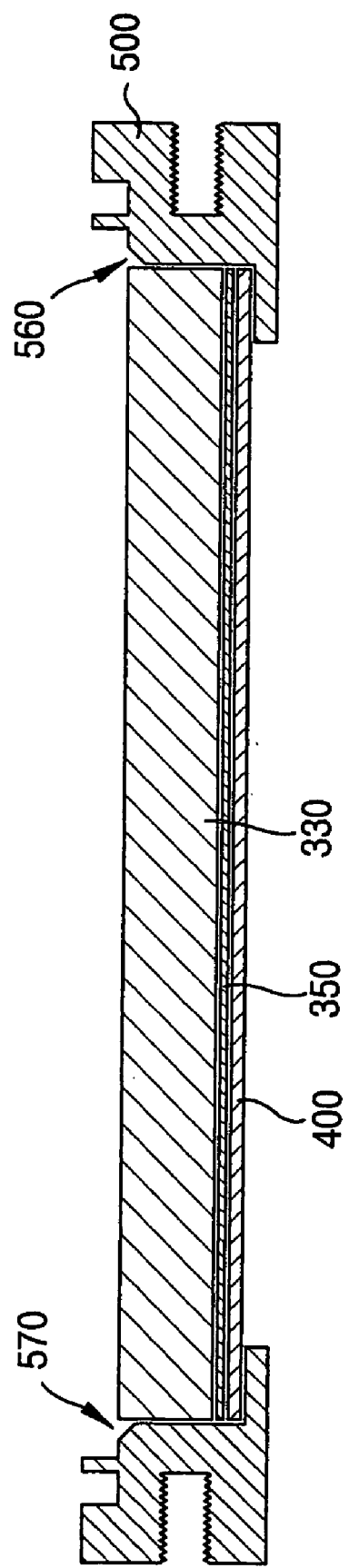
FIG. 15 is a cross-sectional view taken along the line II–II' showing the assembled structure of FIG. 14.
Figure 16:
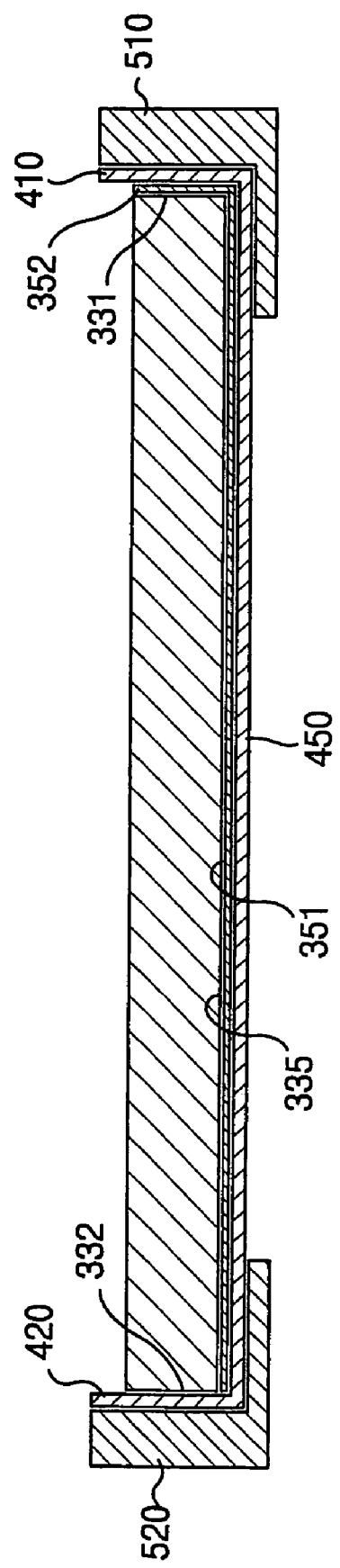
FIG. 16 is a cross-sectional view taken along the line III–III' for showing the assembled structure of FIG. 14.

FIG. 14 is a schematic view showing an assembled structure of the bottom chassis, reflecting plate and light guide plate, FIG. 15 is a cross-sectional view taken along the line II–II' showing the assembled structure of FIG. 14, and FIG. 16 is a cross-sectional view taken along the line III–III' showing the assembled structure of FIG. 14.

Referring to FIGS. 14 to 16, the reflecting plate 350 and the light guide plate 330 are sequentially received in the bottom chassis 400. When the reflecting plate 350 is received in the bottom chassis 400, the first reflecting surface 351 of the reflecting plate 350 is disposed on the bottom surface 450 of the bottom chassis 400 and the second reflecting surface 352 faces the first side surface 410 of the bottom chassis 400. The first fixing protrusion 560 of the bottom mold frame 500 is inserted into the seventh opening 352a disposed of the second reflecting surface 352.

When the light guide plate 330 is received on the reflecting plate 350, the reflecting surface 335 of the light guide plate 330 faces the first reflecting surface 351 and the first side surface 331 of the light guide plate 330 faces the second reflecting surface 352 of the reflecting plate 350. The first and second fixing recesses 331a and 332a of the light guide plate 330 are combined to the first and second fixing protrusions 560 and 570, respectively. The first to fourth catching recesses 337a, 337b, 337c and 337d disposed on the four corners of the light guide plate 330 are combined to the first to fourth catching protrusions 581, 582, 583 and 584 of the bottom mold frame 500, respectively. Thus, the light guide plate 330 may be fixed to the bottom mold frame 500.

Figure 17:
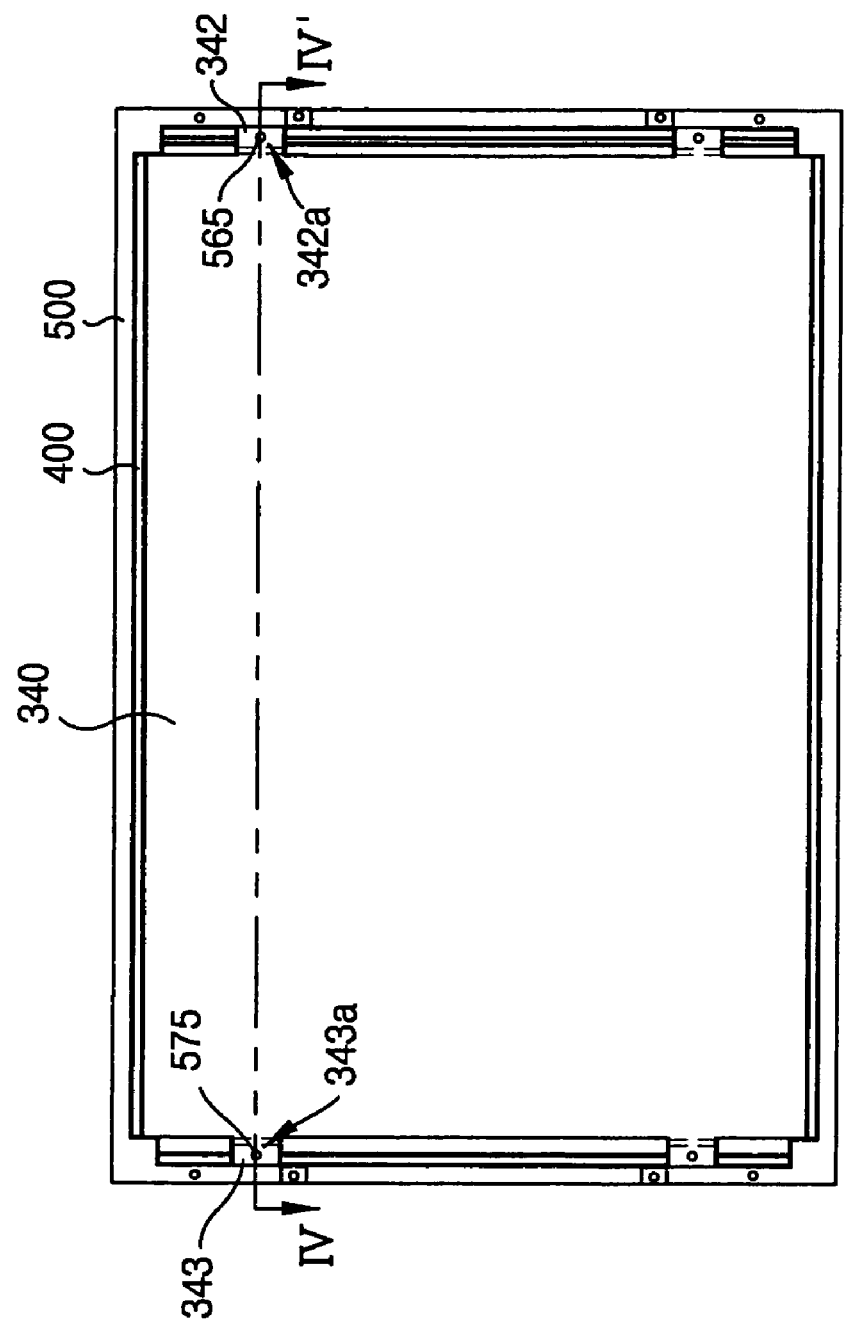
FIG. 17 is a schematic view showing an assembled structure of the bottom chassis, reflecting plate, light guide plate, and optical sheets, according to the present invention.
Figure 18:
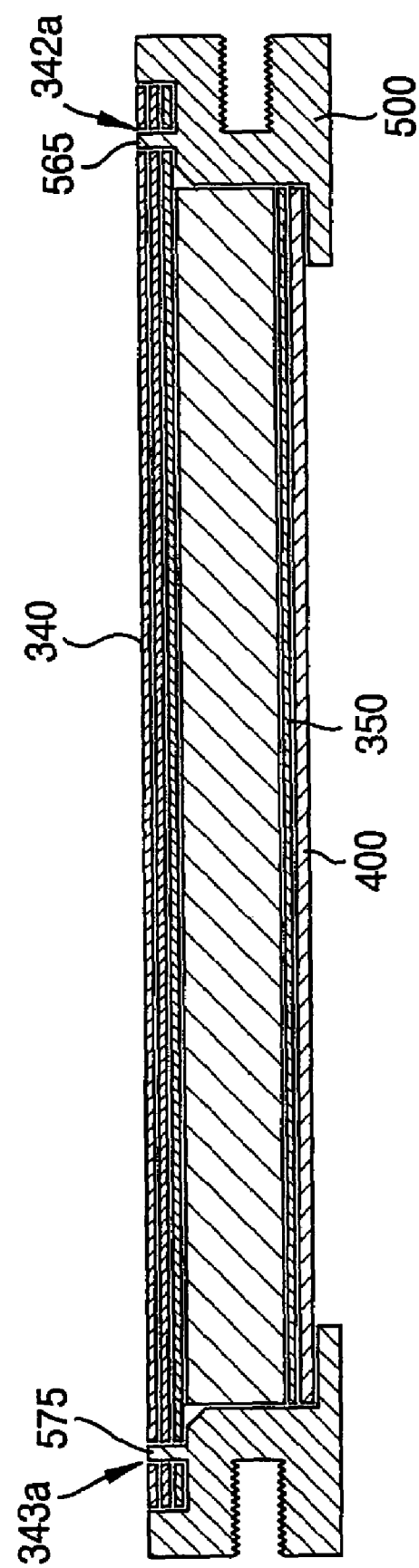
FIG. 18 is a cross-sectional view taken along the line IV–IV' showing the assembled structure of FIG. 17.

FIG. 17 is a schematic view showing an assembled structure of bottom chassis, reflecting plate, light guide plate, and the optical sheets and FIG. 18 is a cross-sectional view taken along the line IV–IV' showing the assembled structure of FIG. 17.

Referring to FIGS. 17 and 18, the optical sheets 340 are received on the emitting surface 336 of the light guiding plate 330 (which is received in the bottom chassis 400). The body portion 341 faces the emitting surface 336, the first fixing hole 342a disposed on the first fixing portion 342 of the optical sheets 340 is engaged to the first sheet fixing protrusion 565 of the bottom mold frame 500 and the second fixing hole 343a disposed on the second fixing portion 343 of the optical sheets 340 is engaged to the second sheet fixing protrusion 575 of the bottom mold frame 500. Thus, the optical sheets 340 is fixed to the bottom mold frame 500.

Figure 19:
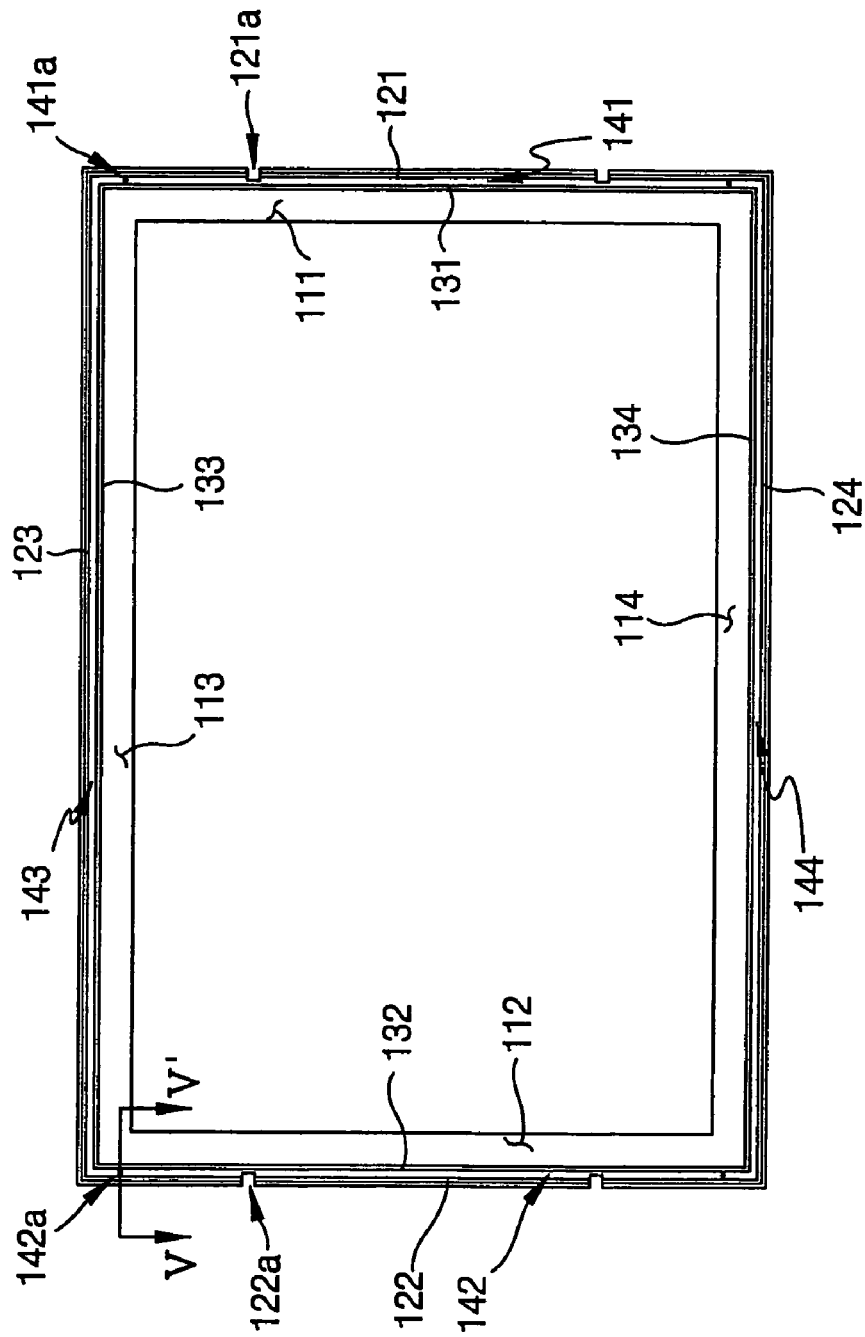
FIG. 19 is a schematic view showing a structure of the top mold frame shown in FIG. 1.
Figure 20:
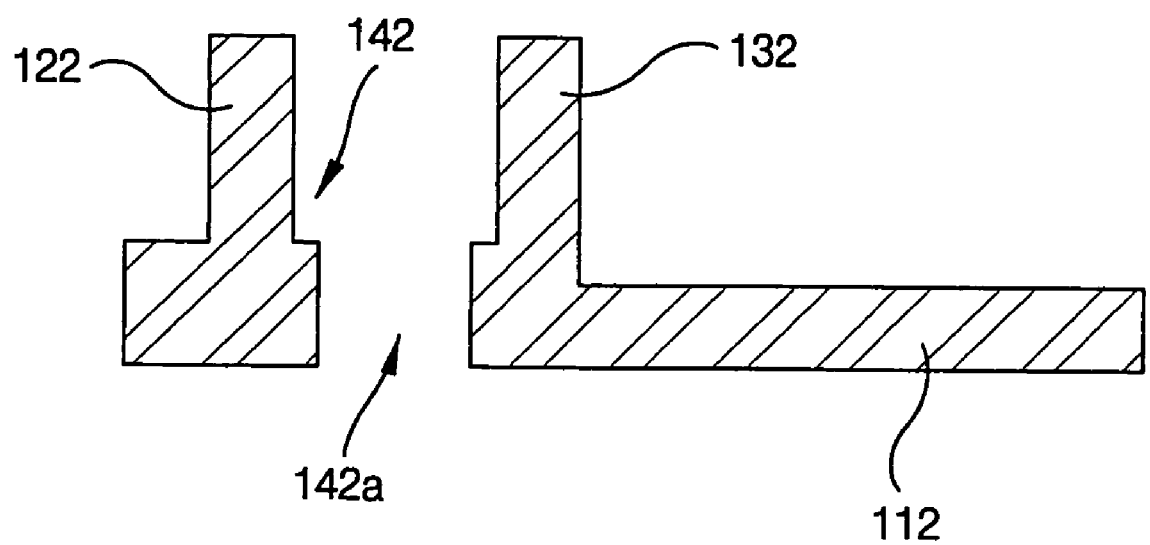
FIG. 20 is a cross-sectional view taken along the line V–V' showing the structure of the top mold frame of FIG. 19.

FIG. 19 is a schematic view showing a structure of the top mold frame shown in FIG. 1 and FIG. 20 is a cross-sectional view taken along the line V–V' showing the structure of FIG. 19.

Referring to FIGS. 19 and 20, the top mold frame 100 includes fifth to eighth sidewalls 121, 122, 123 and 124 integrally formed with each other and first to fourth bottom surfaces 111, 112, 113 and 114 respectively extended from the fifth to eighth sidewalls 121, 122, 123 and 124. The bottom surface comprising the first to fourth bottom surfaces 111, 112, 113 and 114 is opened in a predetermined size.

The top mold frame 100 includes first to fourth barrier ribs 131, 132, 133 and 134 disposed on the first to fourth bottom surfaces 111, 112, 113 and 114, respectively. The first to fourth barrier ribs 131, 132, 133 and 134 are separated from the fifth to eighth sidewalls 121, 122, 123 and 124 in a predetermined distance. For instance, a first guide groove 141 is disposed between the fifth sidewall 121 and the first barrier rib 131, a second guide groove 142 is disposed between the sixth sidewall 122 and the second barrier rib 132, a third guide groove 143 is disposed between the seventh sidewall 123 and the third sidewall 133, and a fourth guide groove 144 is disposed between the eighth sidewall 124 and the fourth barrier rib 134.

The first to fourth guide grooves 141, 142, 143 and 144 have a predetermined depth determined by the fifth to eighth sidewalls 121, 122, 123 and 124 and the first to fourth barrier ribs 131, 132, 133 and 134. The first to fourth guide grooves 141, 142, 143 and 144 receive power supply lines (not shown) of the first and second lamp units 310 and 320 and withdraw the power supply lines to the external.

First and second receiving holes 141a and 142a are disposed on the first and second guide grooves 141 and 142 by perforating through the first and second bottom surfaces 111 and 112. The first and second receiving holes 141a and 142a are engaged with the first and second mold fixing protrusions 512 and 522 protruded from the upper surface of the first and second sidewalls 510 and 520 of the bottom mold frame 500. The first and second receiving holes 141a and 142a may have a recess shape recessed from the first and second bottom surfaces 111 and 112 in a predetermined depth.

As shown in FIG. 19, the top mold frame 100 includes a third receiving recess 121a disposed on the fifth sidewall 121 thereof and recessed toward the first barrier rib 131 and a fourth receiving recess 122a disposed on the sixth sidewall 122 thereof and recessed toward the second barrier rib 132. When the top mold frame 100 is disposed on the bottom chassis 400, the third and fourth receiving recesses 121a and 122a are combined to the first and second combining portions 460 and 470 of the bottom chassis 400.

Figure 21:
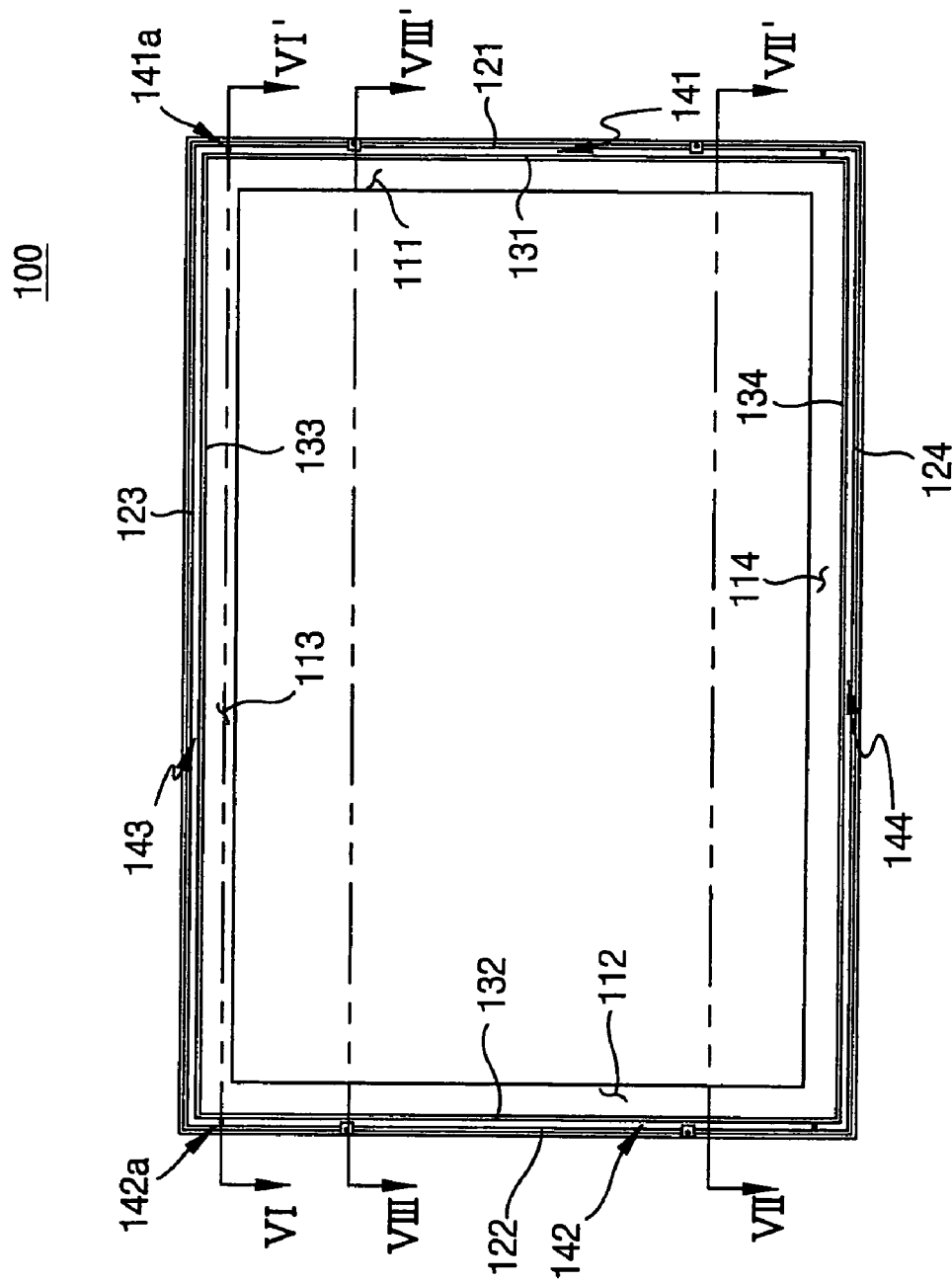
FIG. 21 is a schematic view showing an assembled structure of the bottom chassis, reflecting plate, light guide plate, optical sheets, and top mold frame, according to the present invention.
Figure 22:
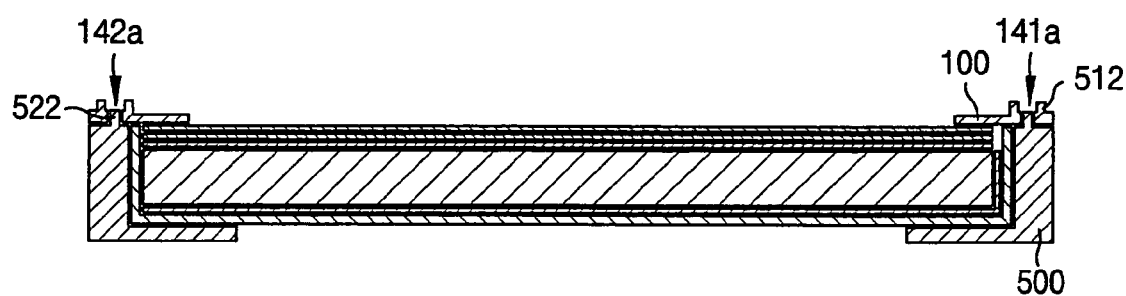
FIG. 22 is a cross-sectional view taken along the line VI–VI' showing the assembled structure of FIG. 21.
Figure 23:
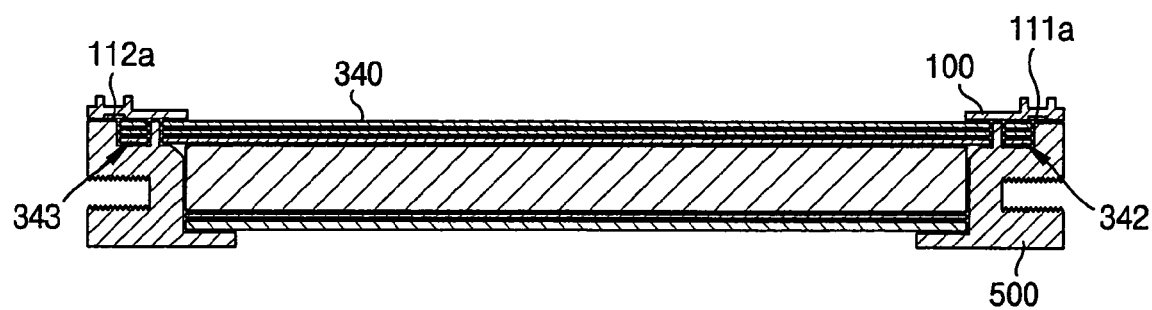
FIG. 23 is a cross-sectional view taken along the line VII–VII' showing the assembled structure of FIG. 21.
Figure 24:
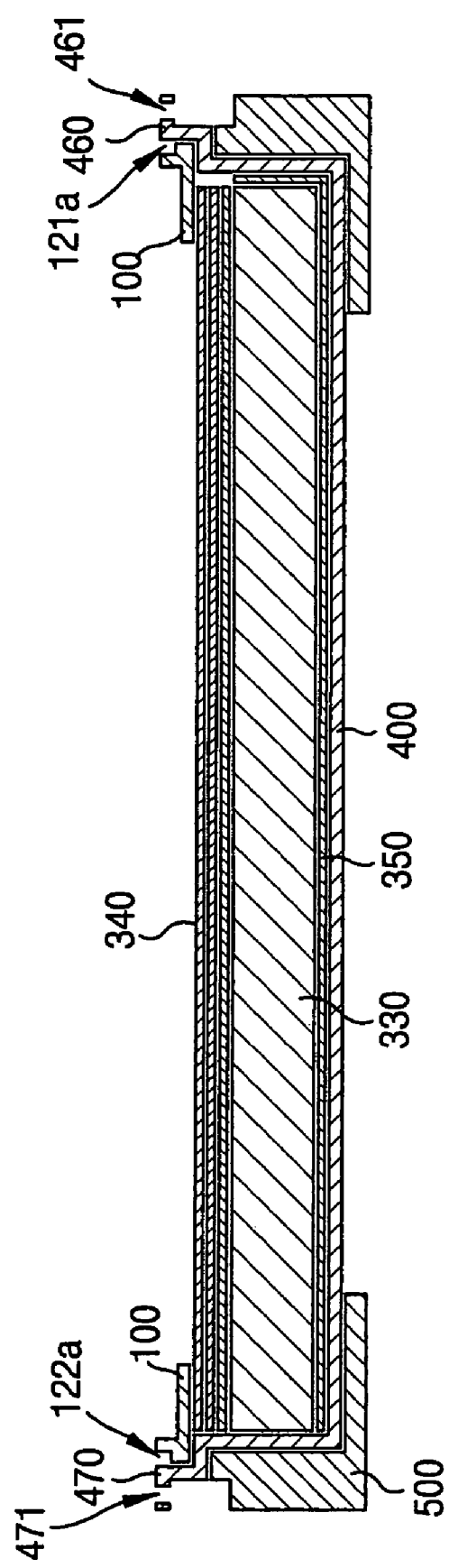
FIG. 24 is a cross-sectional view taken along the line VIII–VIII' showing the assembled structure of FIG. 21.

FIG. 21 is a schematic view showing an assembled structure of the bottom chassis, reflecting plate, light guide plate, optical sheets, and top mold frame according to the present invention, FIG. 22 is a cross-sectional view taken along the line VI–VI' showing the assembled structure of FIG. 21, FIG. 23 is a cross-sectional view taken along the line VII–VII' showing the assembled structure of FIG. 21, and FIG. 24 is a cross-sectional view taken along the line VIII–VIII' showing the assembled structure of FIG. 21.

Referring to FIGS. 21 and 22, the top mold frame 100 is disposed on the bottom mold frame 500. The first to fourth bottom surfaces 111, 112, 113 and 114 of the top mold frame 100 press on the optical sheets 340.

The first and second receiving holes 141a and 142a of the top mold frame 100 are engaged to the first and second mold fixing protrusions 512 and 522 of the bottom mold frame 500, respectively. Accordingly, the top mold frame 100 is fixed to the bottom mold frame 500.

As shown in FIG. 23, a first adhesive tape 111a and a second adhesive tape 112a may be adhered to the rear surface of the top mold frame 100 so as to prevent the optical sheets 340 from being moved. The first and second adhesive tapes 111a and 112a are disposed on an area of the rear surface of the top mold frame 100 corresponding to the first and second fixing portions 342 and 343 of the optical sheets 340. For instance, the first and second adhesive tapes 111a and 112a are a double-sided adhesive tape and are disposed between the top mold frame 100 and the bottom mold frame 500. In this case, one surfaces of the first and second adhesive tapes 111a and 112a are adhered to the top mold frame 100 and the other surfaces of the first and second adhesive tapes 111a and 112a are adhered to the bottom mold frame 500 through the first and second fixing portions 342 and 343 of the optical sheets 340, respectively. Thus, the optical sheets 340 are fixed to the bottom mold frame 500 by means of the first and second adhesive tapes 111a and 112a.

The top mold frame 100 preferably comprises a first material having a high light absorption rate so as to intercept the light leaked from the backlight assembly 300. For example, the top mold frame 100 may have a black color, so that the top mold frame 100 can prevent the light from being leaked to the external.

The first and second adhesive tapes 111a and 112a comprises a second material having a lower light absorption rate than that of the first material. For example, the first and second adhesive tapes 111a and 112a may have a white color. Thus, the first and second adhesive tapes 111a and 112a have a light reflectance higher than that of the top mold frame 100. The first and second adhesive tapes 111a and 112a reflects the light applied to the first and second fixing portions 342 and 343 of the optical sheets 340 to enhance the brightness of the light at the first and second fixing portions 342 and 343.

Referring to FIGS. 21 to 24, the first combining portion 460 of the bottom chassis 400 is inserted into the third receiving recess 121a of the top mold frame 100 and the second combining portion 470 of the bottom chassis 400 is inserted into the fourth receiving recess 122a. The first and second combining portions 460 and 470 are exposed to the external through the third and fourth receiving recess 121a and 122a. The first and second combining portions 460 and 470 are protruded from the upper surface of the first and second side surfaces 410 and 420 of the bottom chassis 400 by a height of the top mold frame 100.

Figure 25:
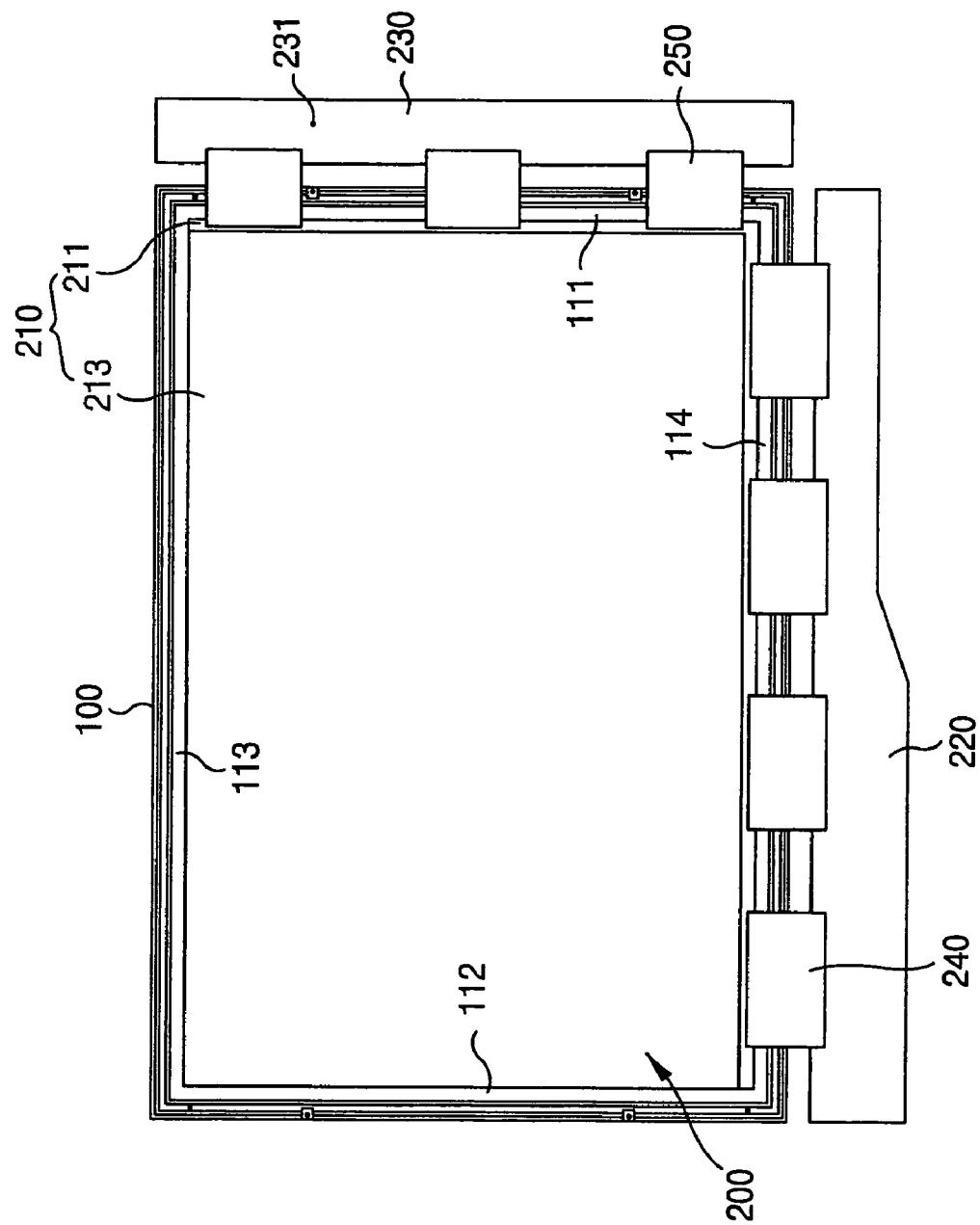
FIG. 25 is a schematic view showing an assembled structure of the bottom chassis, reflecting plate, light guide plate, optical sheets, top mold frame, and the display unit, according to the present invention.
Figure 26:
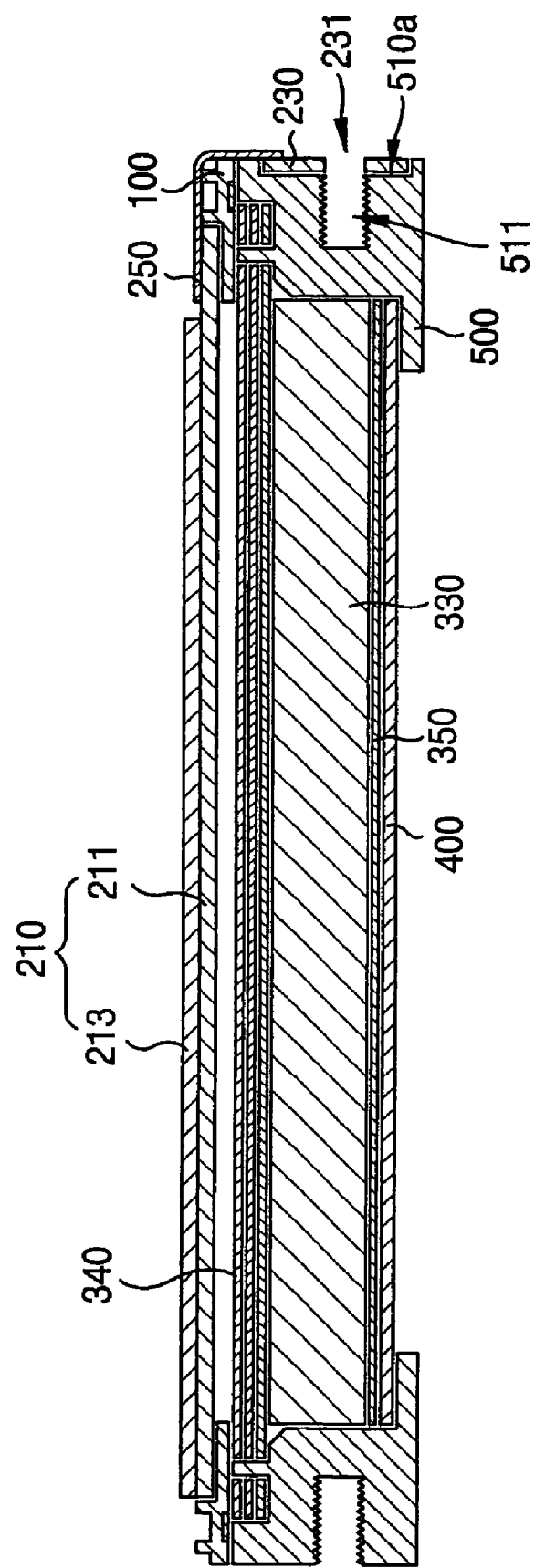
FIG. 26 is a cross-sectional view taken along the line IXI–IX' for showing the assembled structure of FIG. 25.

FIG. 25 is a schematic view for showing an assembled structure of the bottom chassis, reflecting plate, light guide plate, optical sheets, top mold frame, and display unit, according to the present invention and FIG. 26 is a cross-sectional view taken along the line IXI-IX' for showing the assembled structure of FIG. 25.

Referring to FIG. 25, the display unit 200 is disposed on the first to fourth bottom surfaces 111, 112, 113 and 114 of the top mold frame 100, so that the first to fourth bottom surfaces 111, 112, 113 and 114 come in contact with the TFT substrate 211 of the LCD panel 210.

The LCD panel 210 comprises an effective display area where the TFT substrate 211 faces the color filter substrate 213 and the other display areas, i.e., a non-effective display area. The non-effective display area includes a data portion connected to the data PCB 220 through the data TCP 240 and a gate portion connected to the gate PCB 230 through the gate TCP 250.

When the display unit 200 is received on the top mold frame 100, the data TCP 240 is bent to cover the fourth sidewall 540 of the bottom mold frame 500 and the data PCB 220 is disposed on the rear surface of the bottom chassis 400. The gate TCP 250 is extended to the first sidewall 510 of the bottom mold frame 500 and the gate PCB 230 is received in the first sidewall 510.

As shown in FIG. 26, the gate PCB 230 includes a first engaging recess 231 corresponding to the first engaging hole 511 disposed on the bottom mold frame 500. When the gate PCB 230 is received in the first sidewall 510 of the bottom mold frame 500, the first engaging recess 231 corresponds to the first engaging hole 511.

Figure 27:
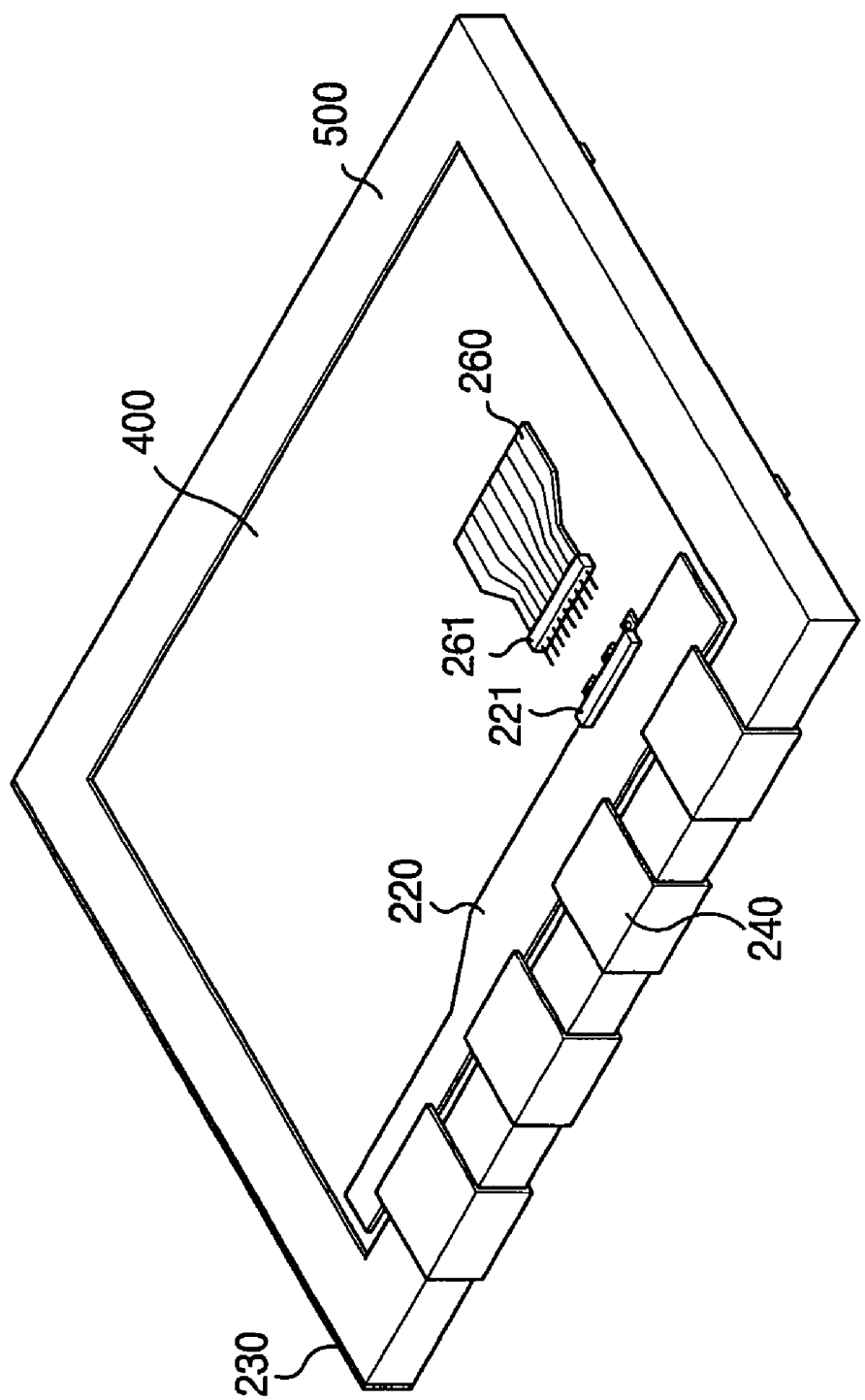
FIG. 27 is a perspective view showing a bottom surface of the assembled structure of FIG. 25.
Figure 28:
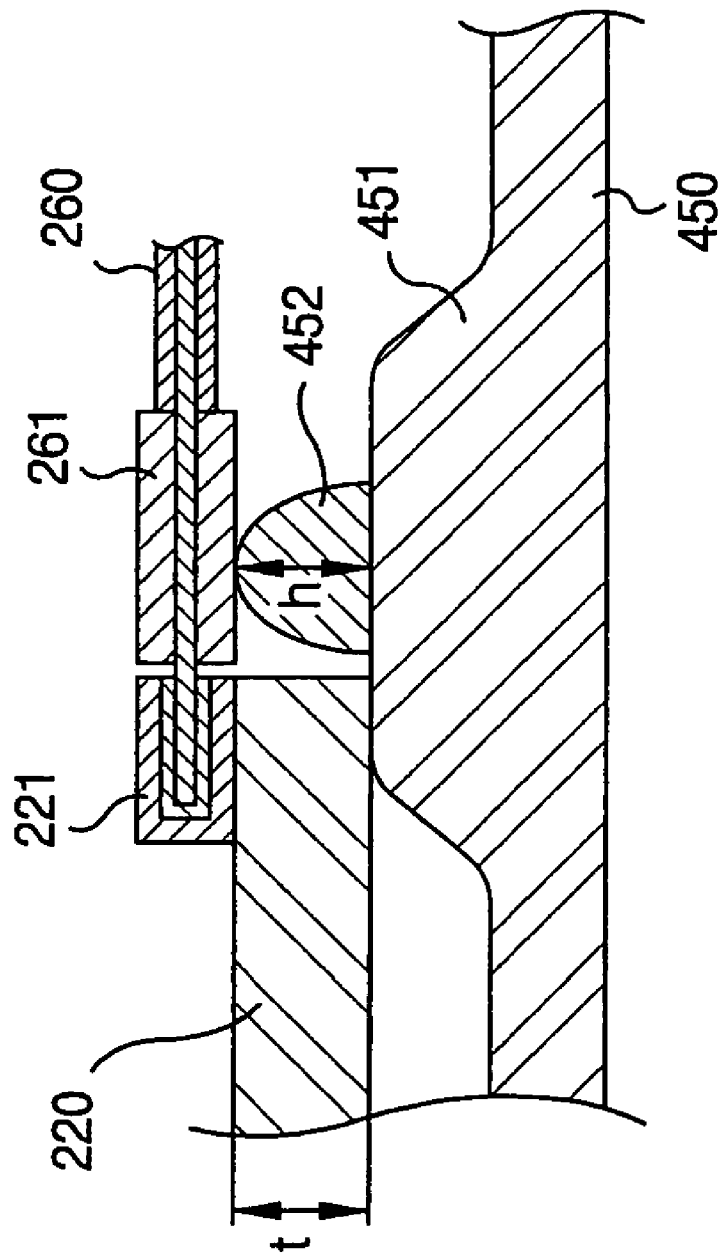
FIG. 28 is a cross-sectional view taken along the line X–X' showing the assembled structure of FIG. 27.

FIG. 27 is a perspective view showing a bottom surface of the assembled structure of FIG. 25 and FIG. 28 is a cross-sectional view take along the line X–X' showing the assembled structure of FIG. 27.

Referring to FIGS. 27 and 28, the bottom chassis 400 includes a first supporting portion 451 projected from the rear surface thereof and a second supporting portion 452 embossed from the first supporting portion 451. The end portion of the data PCB 220 is disposed on the first supporting portion 451 and connected to a first connector 221 for receiving electric signals from an external information-processing device (not shown). The first connector 221 is coupled to a second connector 261 attached to a flexible printed circuit board 260 electrically connected to the external information-processing device. For instance, the first connector 221 is a socket and the second connector 261 is a plug.

By coupling the first connector 221 to the second connector 261, the data PCB 220 is electrically connected to the external information-processing device. The second connector 261 is separated from the first supporting portion 451 by a thickness "t" of the data PCB 220. The second supporting portion 452, having a height "h" substantially identical to the thickness "t" of the data PCB 220, supports the second connector 261, and thus, the second connector 261 is stably fixed to first connector 221 and is prevented from being deviated from the first connector 221.

Figure 29:
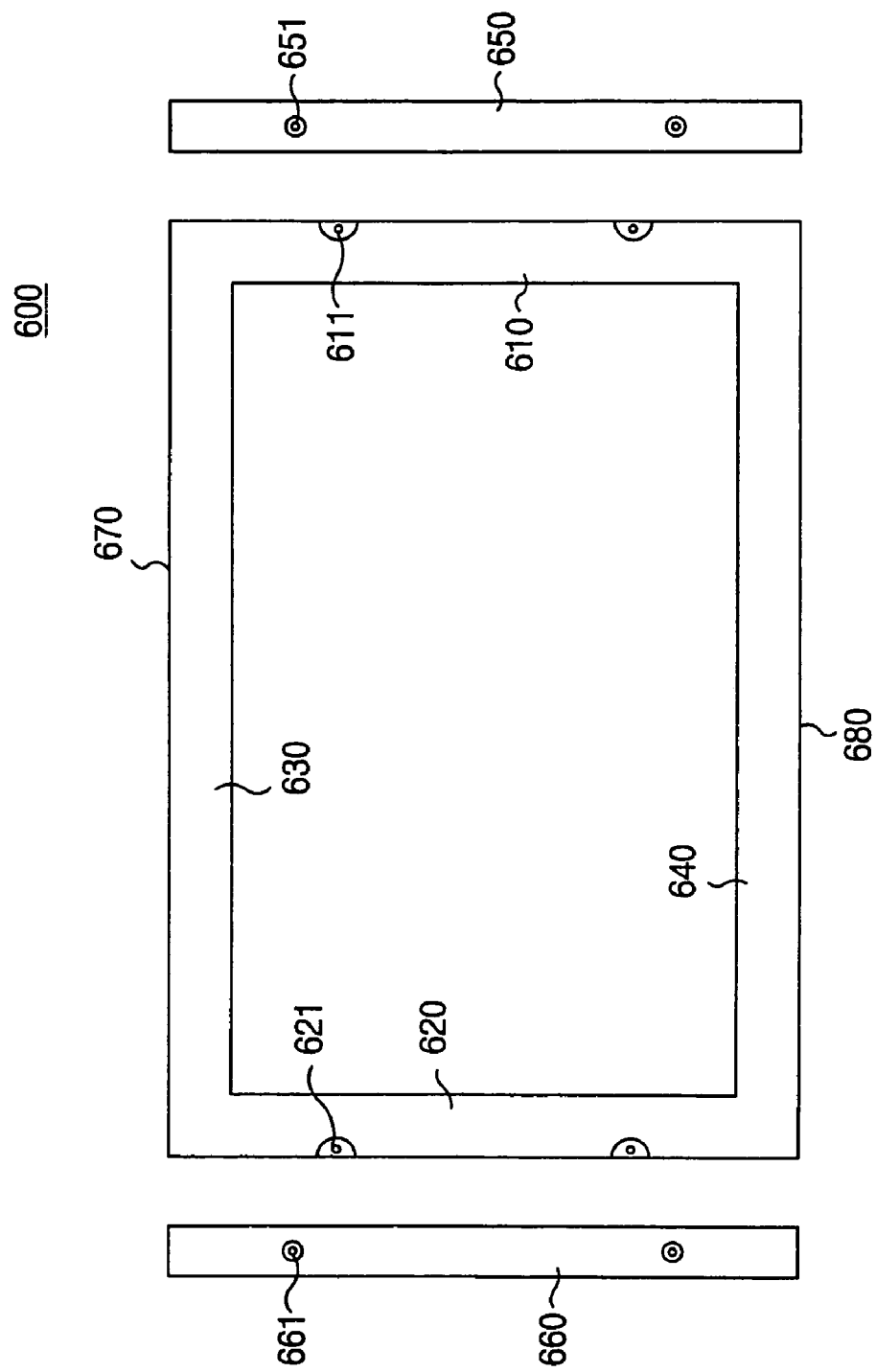
FIGS. 29 and 30 are schematic views showing a structure of the top chassis shown in FIG. 1.
Figure 30:
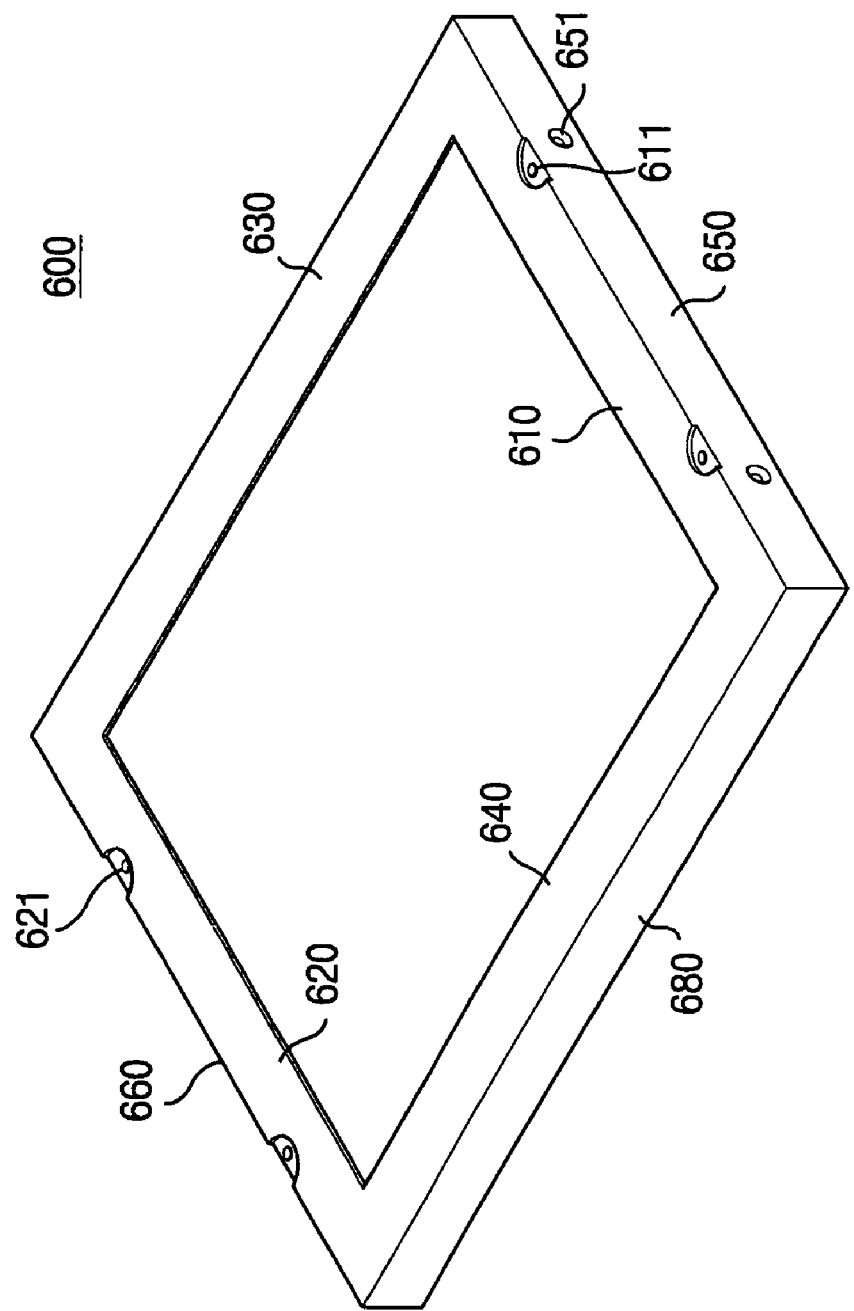

FIGS. 29 and 30 are schematic views showing a structure of the top chassis shown in FIG. 1.

Referring to FIGS. 29 and 30, the top chassis 600 includes first to fourth upper surfaces 610, 620, 630 and 640 integrally formed with each other and fifth to eighth side surfaces 650, 660, 670 and 680 extended from the first to fourth upper surfaces 610, 620, 630 and 640, respectively.

The top chassis 600 is provided with a third penetration hole 611 penetrated through the first upper surface 610 and a fourth penetration hole 621 penetrated through the second upper surface 620. The third and fourth penetration holes 611 and 621 respectively correspond to the first and second penetration holes 461 and 471 disposed on the first and second combining portions 460 and 470 of the bottom chassis 400.

The top chassis 600 is provided with a second engaging recess 651 penetrating through the fifth side surface 650 and a third engaging recess 661 penetrating through the sixth side surface 660. The second and third engaging recesses 651 and 661 correspond to the first and second engaging holes 511 and 521 of the bottom mold frame 500, respectively.

Figure 31:
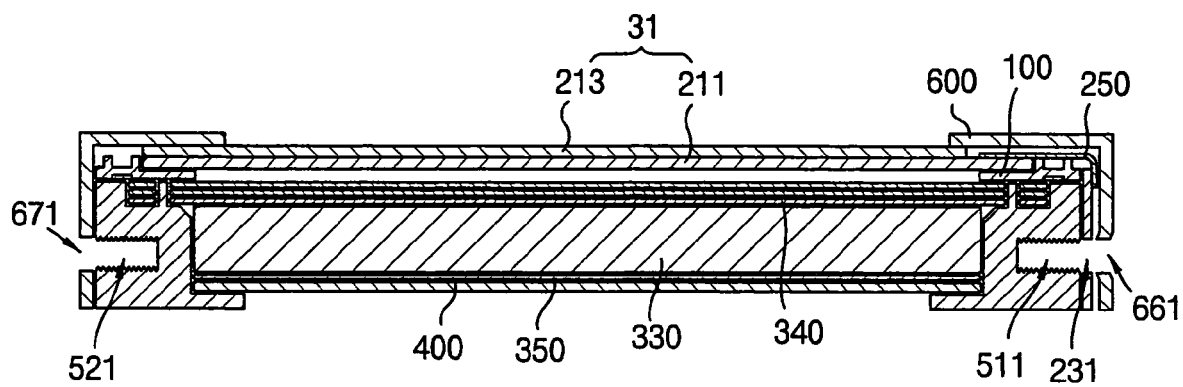
FIGS. 31 and 32 are cross-sectional views showing an assembled structure of the bottom chassis, reflecting plate, light guide plate, optical sheets, top mold frame, the display unit, and top chassis, according to the present invention.
Figure 32:
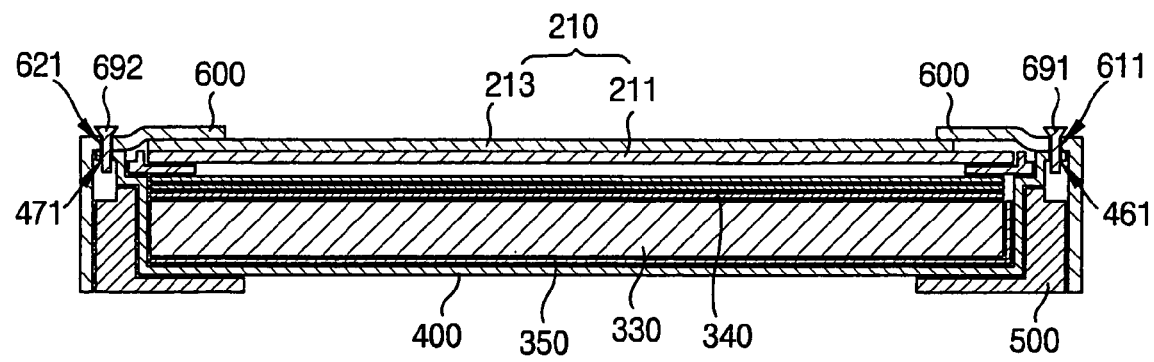

FIGS. 31 and 32 are cross-sectional views showing an assembled structure of the bottom chassis, reflecting plate, light guide plate, optical sheets, top mold frame, the display unit, and top chassis, according to the present invention.

Referring to FIG. 31, when the top chassis 600 is provided on the LCD panel 210, the first and second upper surfaces 610 and 620 press on the non-effective display area of the LCD panel 210 and the fifth and sixth side surfaces 650 and 660 face the first and second sidewalls 510 and 520 of the bottom mold frame 500. The gate PCB 230 is disposed between the fifth side surface 650 of the top chassis 600 and the first sidewall 510 of the bottom mold frame 500.

Also, the second engaging recess 651 of the top chassis 600 corresponds to the first engaging recess 231 of the gate PCB 230 and the first engaging hole 511 of the bottom mold frame 500. The third engaging recess 661 of the top chassis 600 corresponds to the second engaging hole 521 of the bottom mold frame 500. Since a portion around the second engaging recess 651 is slightly concaved in a predetermined depth, the top chassis 600 press the gate PCB 230 by the predetermined depth.

Referring to FIG. 32, the top chassis 600 may be combined to the bottom chassis 400 using first and second screws 691 and 692. For instance, the first screw 691 is engaged into the first penetration hole 461 through the third penetration hole 611 and the second screw 692 is engaged into the second penetration hole 471 through the fourth penetration hole 621. Thus, the LCD apparatus 1000 may be easily assembled.

Figure 33:
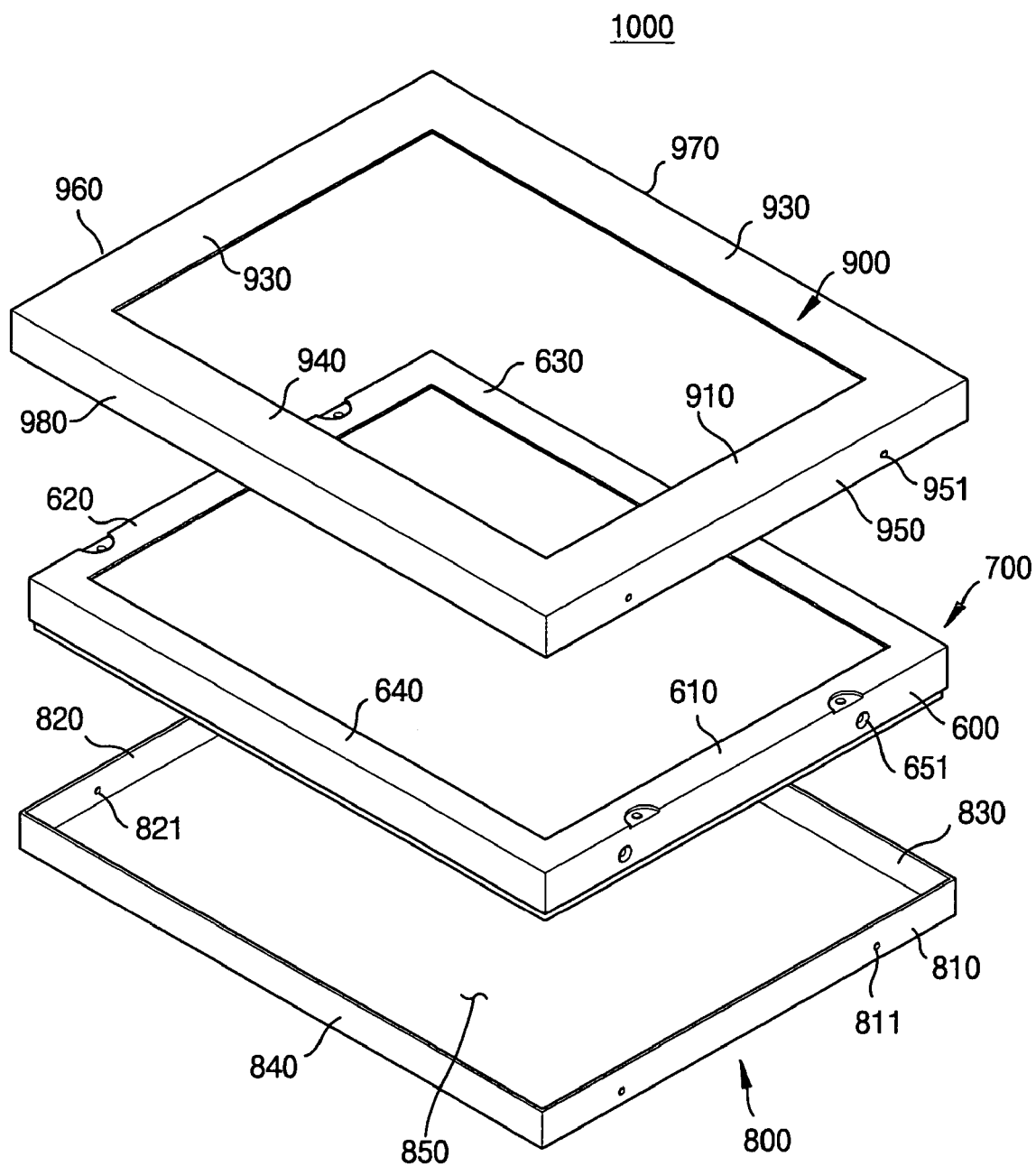
FIG. 33 is a perspective view showing a combined structure of a LCD module and cases, according to the present invention.
Figure 34:
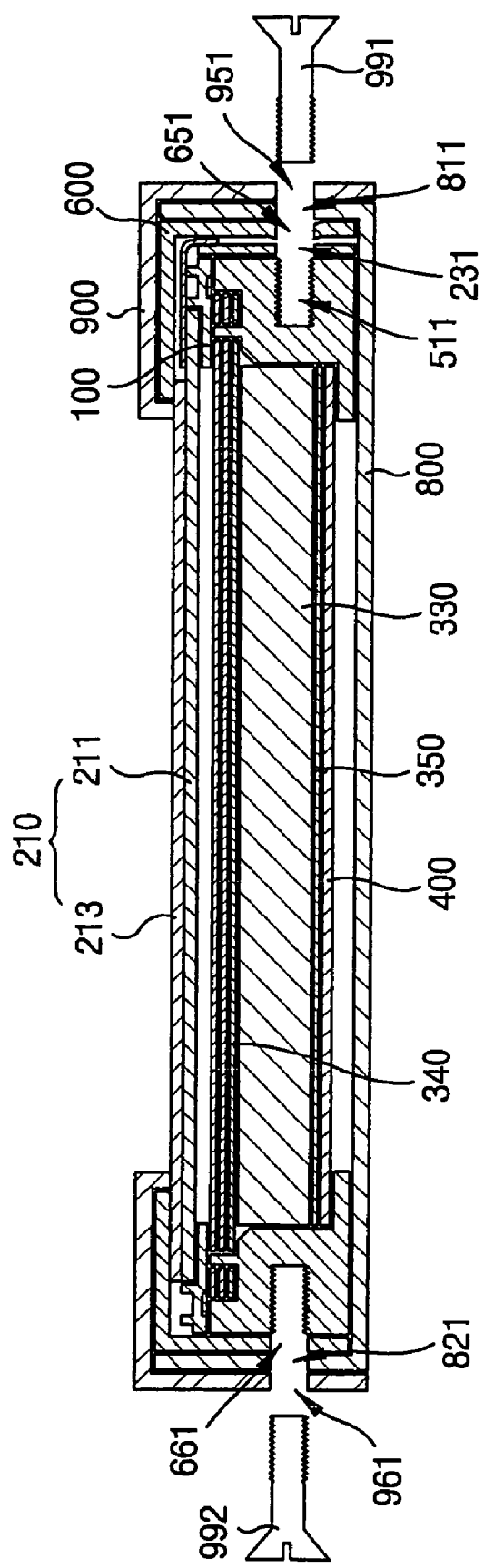
FIG. 34 is a cross-sectional view showing the combined structure of FIG. 33.

FIG. 33 is a perspective view showing a combined structure of a LCD module and cases, according to the present invention and FIG. 34 is a cross-sectional view showing the combined structure of FIG. 33.

Referring to FIGS. 33 and 34, the LCD module 700 assembled according to an embodiment of the present invention is received in the front and rear cases 900 and 800. The rear case 800 includes ninth to twelfth sidewalls 810, 820, 830 and 840 integrally formed with each other and a fifth bottom surface 850 connected to the ninth to twelfth sidewalls 810, 820, 830 and 840 to provide the receiving space in which the LCD module 700 is received. When the LCD module 700 is received in the receiving space of the rear case 800, the fifth to eighth side surfaces 650, 660, 670 and 680 of the top chassis 600 face the ninth to twelfth sidewalls 810, 820, 830 and 840, respectively.

The rear case 800 is provided with a fourth engaging recess 811 penetrating through the ninth sidewall 810 and a fifth engaging recess 821 penetrating through the tenth sidewall 820. The fourth engaging recess 811 corresponds to the second engaging recess 651 of the top chassis 600, the first engaging recess 231 of the gate PCB 230 and the first engaging hole 511 of the bottom mold frame 500, and the fifth engaging recess 821 corresponds to the third engaging recess 661 of the top chassis 600 and the second engaging holes 521 of the bottom mold frame 500.

The front case 900 includes fifth to eighth upper surfaces 910, 920, 930 and 940 integrally formed with each other and ninth to twelfth side surfaces 950, 960, 970 and 980 extended from the fifth to eighth upper surfaces 910, 920, 930 and 940, respectively. When the front case 900 is coupled to the rear case 800 in which the LCD module 700 is received, the fifth to eighth upper surfaces 910, 920, 930 and 940 face the first to fourth upper surfaces 610, 620, 630 and 640 of the top chassis 600 and the ninth to twelfth side surfaces 950, 960, 970 and 980 face the ninth to twelfth sidewalls 810, 820, 830 and 840.

The front case 900 is provided with a sixth engaging recess 951 penetrating through the ninth side surface 950 and a seventh engaging recess 961 penetrating through the tenth side surface 960. The sixth engaging recess 951 corresponds to the fourth engaging recess 811 of the rear case 800, the second engaging recess 651 of the top chassis 600, the first engaging recess 231 of the gate PCB 230 and the first engaging hole 511 of the bottom mold frame 500. The seventh engaging recess 961 corresponds to the fifth engaging recess 821 of the rear case 800, the third engaging recess 661 of the top chassis 600 and the second engaging hole 521 of the bottom mold frame 500.

The front case 900, rear case 800 and LCD module 700 are combined to each other by a third screw 991 and a fourth screw 992. The third screw 991 is engaged to the first engaging hole 511 after sequentially passing through the sixth engaging recess 951, fourth engaging recess 811, second engaging recess 651 and first engaging recess 231. The fourth screw 992 is engaged to the second hole 521 after sequentially passing through the seventh engaging recess 961, fifth engaging recess 821, third engaging recess 661.

In the backlight assembly and the LCD apparatus according to preferred embodiments of the present invention, the light guide plate comprises at least one fixing recess disposed on at least one side surface of the light guide plate. The receiving container such as the bottom mold frame, bottom chassis and so on comprises at least one fixing protrusion corresponding to the fixing recess, and at least one engaging hole corresponding to the fixing protrusion and disposed on the sidewall thereof.

The fixing protrusion fixes the light guide plate to the receiving container and provides a space for forming the engaging hole. Accordingly, it is able to reduce an overall size of the LCD apparatus and easily assemble the LCD apparatus.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly comprising:
   a lamp unit to generate a light;
   a light guide unit to guide the light, the light guide unit comprising side surfaces to receive the light, a reflecting surface to reflect the light input through the side surfaces, an emitting surface to emit the light input through the side surfaces and the light reflected from the reflecting surface, and at least one fixing recess being disposed on at least one side surface of the side surfaces;

a receiving container comprising sidewalls to provide a receiving space for receiving the lamp unit and the light guide unit, and at least one fixing protrusion protruded from one of the sidewalls toward the receiving space and fixed to the fixing recess of the light guide unit, the fixing protrusion having a sheet fixing protrusion; and an optical sheet disposed on the emitting surface of the light guide unit, the optical sheet having a fixing hole coupled to the sheet fixing protrusion.

2. The backlight assembly of claim 1, wherein the optical sheet comprises:

a body portion facing the emitting surface of the light guide unit; and a fixing portion extended from the body portion.

3. The backlight assembly of claim 2, wherein the fixing hole is formed through the fixing portion.

4. The backlight assembly of claim 1, wherein the fixing protrusion comprises a guide surface to guide the light guide unit, a lower surface facing a bottom surface of the receiving container and an upper surface opposite the lower surface.

5. The backlight assembly of claim 4, wherein the fixing protrusion further comprises an inclined surface, disposed between the guide surface and upper surface, so as to reflect the light leaked from the light guide unit.

6. The backlight assembly of claim 1, wherein the light guide unit comprises a catching recess disposed at a corner portion adjacent to the lamp unit among corner portions of the light guide unit.

7. The backlight assembly of claim 6, wherein the receiving container comprises a catching protrusion disposed on an area corresponding to the corner portion of the light guide unit and combined to the catching recess.

8. The backlight assembly of claim 1, further comprising a reflecting plate to reflect the light leaked from the light guide unit to the reflecting surface of the light guide unit.

9. The backlight assembly of claim 8, wherein the reflecting plate comprises:

a first reflecting surface facing the reflecting surface of the light guide unit; and a second reflecting surface extended from the first reflecting surface and facing one of the side surfaces of the light guide unit, the second reflecting surface comprising an opening for exposing the fixing protrusion of the receiving container.

10. An LCD apparatus comprising:

a lamp unit to generate a light;

a light guide unit to guide the light, the light guide unit comprising side surfaces to receive the light, a reflecting surface to reflect the light input through the side surfaces, an emitting surface to emit the light input through the side surfaces and the light reflected from the reflecting surface, and at least one fixing recess being disposed on at least one side surface of the side surfaces; and a first receiving container to fix the lamp unit and the light guide unit to an external case, the first receiving container comprising first sidewalls to provide a first receiving space for receiving the lamp unit and the light guide unit, at least one fixing protrusion protruded from one of the first sidewalls toward the first receiving space and fixed to the fixing recess, and at least one first engaging hole disposed on an area of the first sidewalls corresponding to fixing protrusion, the fixing protrusion having a sheet fixing protrusion;

an optical sheet disposed on the emitting surface of the light guide unit, the optical sheet having a fixing hole coupled to the sheet fixing protrusion;

an LCD panel, received in the first receiving container, to receive the light from the light guide unit and displaying an image in response to the received light; and a second receiving container to fix the LCD panel to the first receiving container, the second receiving container comprising an upper surface to press the LCD panel, second sidewalls extended from the upper surface and coupled to the first receiving container, and a first engaging recess corresponding to the first engaging hole.

11. The LCD apparatus of claim 10, wherein the optical sheet comprises:

a body portion facing the emitting surface of the light guide unit; and a fixing portion extended from the body portion.

12. The LCD apparatus of claim 11, wherein the fixing hole is formed through the fixing portion.

13. The LCD apparatus of claim 10, wherein the light guide unit comprises a catching recess disposed at a corner portion adjacent to the lamp unit among corner portions of the light guide unit.

14. The LCD apparatus of claim 13, wherein the receiving container comprises a catching protrusion disposed on an area corresponding to the corner portion of the light guide unit and combined to the catching recess.

15. The LCD apparatus of claim 10, further comprising a reflecting plate to reflect the light leaked from the light guide unit to the reflecting surface of the light guide unit.

16. The LCD apparatus of claim 15, wherein the reflecting plate comprises:

a first reflecting surface facing the reflecting surface of the light guide unit; and a second reflecting surface extended from the first reflecting surface and facing one of the side surfaces of the light guide unit, the second reflecting surface comprising an opening for exposing the fixing protrusion of the receiving container.

17. The LCD apparatus of claim 10, further comprising a third receiving container comprising a receiving surface to receive the light guide unit and third sidewalls extended from the receiving surface and facing the side surface of the light guide unit.

18. The LCD apparatus of claim 17, wherein the third sidewalls has an opening exposing the fixing protrusion of the first container to be faced the side surface of the light guide unit.

* * * * *